US009807767B2

(12) United States Patent
Chen et al.

(10) Patent No.: US 9,807,767 B2
(45) Date of Patent: Oct. 31, 2017

(54) SYSTEMS AND METHODS FOR ALLOCATING TONES BETWEEN USERS IN WIRELESS COMMUNICATION SYSTEMS

(71) Applicant: QUALCOMM Incorporated, San Diego, CA (US)

(72) Inventors: Jialing Li Chen, San Diego, CA (US); Lin Yang, San Diego, CA (US); Sameer Vermani, San Diego, CA (US); Bin Tian, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 79 days.

(21) Appl. No.: 14/848,068

(22) Filed: Sep. 8, 2015

(65) Prior Publication Data

US 2016/0073409 A1    Mar. 10, 2016

Related U.S. Application Data

(60) Provisional application No. 62/048,758, filed on Sep. 10, 2014.

(51) Int. Cl.
*H04L 5/00* (2006.01)
*H04W 72/04* (2009.01)

(52) U.S. Cl.
CPC ....... *H04W 72/0453* (2013.01); *H04L 5/0007* (2013.01); *H04L 5/0037* (2013.01)

(58) Field of Classification Search
None
See application file for complete search history.

(56) References Cited

U.S. PATENT DOCUMENTS

| | | | |
|---|---|---|---|
| 2003/0169681 A1 | 9/2003 | Li et al. | |
| 2005/0207385 A1 | 9/2005 | Gorokhov et al. | |
| 2008/0019340 A1* | 1/2008 | Ohta | H04L 1/1671 370/338 |
| 2008/0025241 A1* | 1/2008 | Bhushan | H04L 12/189 370/312 |

(Continued)

OTHER PUBLICATIONS

International Search Report and Written Opinion—PCT/US2015/049166—ISA/EPO—Dec. 9, 2015.

*Primary Examiner* — Phuc Tran
*Assistant Examiner* — Soon-Dong D Hyun
(74) *Attorney, Agent, or Firm* — Knobbe, Martens, Olson & Bear, LLP

(57) ABSTRACT

Methods and apparatus for signaling tone allocations in OFDMA communication are disclosed herein. In one aspect, the method includes determining a tone allocation which divides a plurality of tones between a plurality of wireless communication devices, the tone allocation including at least one of determining a plurality of subbands, each subband comprising an exclusive contiguous subset of the plurality of tones, at least one subband of the plurality of subbands assigned to two or more devices of the plurality of wireless communication and assigning a tone group size to each wireless communication device of the plurality of wireless communication devices, wherein the tone group size indicates a number of contiguous tones that the wireless communication device is allocated, wherein at least one tone group size is larger than one. The method also includes transmitting the tone allocation to each of the plurality of wireless communication devices.

20 Claims, 27 Drawing Sheets

(56) References Cited

U.S. PATENT DOCUMENTS

| | | | | |
|---|---|---|---|---|
| 2010/0144360 A1* | 6/2010 | Okuda | ............... | H04W 72/042 |
| | | | | 455/450 |
| 2010/0309868 A1* | 12/2010 | Yang | .................... | H04L 5/0007 |
| | | | | 370/329 |
| 2012/0269157 A1 | 10/2012 | Arnott et al. | | |
| 2013/0089124 A1* | 4/2013 | Kim | ...................... | H04B 3/542 |
| | | | | 375/222 |
| 2013/0223550 A1* | 8/2013 | Fimoff | ................. | H04L 1/0045 |
| | | | | 375/261 |
| 2015/0334708 A1* | 11/2015 | Lee | ................... | H04W 72/0446 |
| | | | | 370/329 |
| 2015/0381330 A1* | 12/2015 | Chen | .................... | H04L 5/0046 |
| | | | | 370/329 |

* cited by examiner

| | User 1 | User 2 | User 3 | User 4 |
|---|---|---|---|---|
| Subband | -122:1:-63 | -62:1:-3 | 3:1:62 | 63:1:122 |
| Distributed | -122:4:-6, 3:4:119 | -121:4:-5, 4:4:120 | -120:4:-4, 5:4:121 | -119:4:-3, 6:4:122 |
| Hybrid-I | -122:2:-4 | -121:2:-3 | 3:2:121 | 4:2:122 |
| Hybrid-II (e.g., with 4 tone/block) | -122:16:-10, -121:16:-9, -120:16:-8, -119:16:-7, 11:16:27, 12:16:108, 13:16:109, 14:16:110 | -118:16:-6, -117:16:-5, -116:16:-4, 115:16:-3, 15:16:111, 16:16:112, 17:16:113, 18:16:114 | -114:16:-18, -113:16:-17, -112:16:-16, -111:16:-15, 3:16:115, 4:16:116, 5:16:117, 6:16:118 | -110:16:-14, -109:16:-13, -108:16:-12, -107:16:-11, 7:16:119, 8:16:120, 9:16:121, 10:16:122 |
| Hybrid-III (e.g., with 4 tone/block) | -122:8:-10, -121:8:-9, -120:8:-8, -119:8:-7 | -118:8:-6, -117:8:-5, -116:8:-4, -115:8:-3 | 3:8:115, 4:8:116, 5:8:117, 6:8:118 | 7:8:119, 8:8:120, 9:8:121, 10:8:122 |

FIG. 8

| Aspects | Distributed | Sub-band (or Localized) |
|---|---|---|
| Tx Power Limit | Harder to violate | |
| Frequency selective scheduling gain | | Having advantage |
| Channel Smoothing | | Having advantage |
| OOBE and Mask | May need some extra back-off? | |
| Leakage to adjacent OFDMA tone | Better | |
| Blocking to adjacent channel | | Sub-band dependent, but easier for interference management |
| ETSI Regulatory risk | Less | |

FIG. 9

| Aspects | Comparison |
|---|---|
| Tx Power Limit | From hardest to easiest to violate: Distributed>Hybrid-I>Hybrid-II>Hybrid-III>Subband |
| Frequency selective scheduling gain | From largest to smallest gain: Subband>Hybrid-I≈Hybrid-II≈Hybrid-III>Distributed |
| Channel Smoothing | From largest to smallest gain: Subband>Hybrid-III>Hybrid-II>Hybrid-I>Distributed |
| OOBE and Mask | From possibly highest to lowest OOBE: Distributed≈Hybrid-II>Hybrid-I>Hybrid-III>Subband |
| Leakage to adjacent OFDMA tone | From largest to smallest leakage: Distributed>Hybrid-I>Hybrid-II≈Hybrid-III>Subband |
| Blocking to adjacent channel | Distributed & Hybrid-II: Impact should be similar to non-OFDMA transmission of the same bandwidth<br>Subband & Hybrid-I & Hybrid-II: Impact may depend on the sub-band location; simulations may be needed to quantify the worst case blocking performance degradation |
| ETSI Regulatory risk | From highest to lowest: Subband>Hybrid-I≈Hybrid-II≈Hybrid-II>Distributed |

FIG. 10

| Total BW | 20MHz | | | | 80MHz | | | | |
|---|---|---|---|---|---|---|---|---|---|
| Min allocation BW (MHz) | 5 | 2.5 | 1.25 | 20 | 10 | 5 | 2.5 | 1.25 |
| 1 Rx antenna | 1.0 | 1.7 | 1.9 | 0.7 | 1.5 | 2.1 | 2.5 | 2.6 |
| 2 Rx antennas | 0.7 | 1.3 | 1.5 | 0.5 | 1.1 | 1.7 | 2.0 | 2.1 |
| 4 Rx antennas | 0.6 | 0.9 | 1.1 | 0.4 | 0.8 | 1.2 | 1.5 | 1.6 |

FIG. 15

|  | Distributed | Sub-band |
|---|---|---|
| Tx Power Limit | 12/9/6 dB higher for 1.25/2.5/5MHz allocation |  |
| Frequency selective scheduling gain |  | 1 to 2dB better with feedbacks |
| Channel Smoothing |  | 1dB better |
| OOBE and Mask | May need some extra back-off? |  |
| Leakage to adjacent OFDMA tone | Better (-30dBr) | < -23dBr |
| Blocking to adjacent channel |  | May get worse is the sub-band interferer at the channel edge |
| Regulatory risk | Less |  |

FIG. 16

| BAND | Frequency (GHz) | Permitted Use Location | Point-to-Point Max. Intentional Radiator Power *1 *2 | the max limit of the peak power spectral density in any 1-MHz band | max power per user, assuming 1.25MHz of bandwidth | max power per user, assuming 5MHz of bandwidth |
|---|---|---|---|---|---|---|
| UNII (Low) | 5.15-5.25 | Indoor | AP: 1W<br>STA: 250mw (24dBm) | AP: 17 dBm<br>STA: 11dBm | AP: 18 dBm<br>STA: 12dBm | STA: 18dBm |
| | | Outdoor | AP: 1W (Max EIRP at elevation angle greater than 30 deg = 125 mW)<br>STA: 250mw (24dBm) | AP: 17 dBm<br>STA: 11dBm | AP: 18 dBm<br>STA: 12dBm | STA: 18dBm |
| UNII-2 (Middle) | 5.25-5.35 | Indoor or Outdoor | 250mW (24dBm) | 11 dBm | 12dBm | 18dBm |
| UNII-2 Extended | 5.470-5.725 | Indoor or Outdoor | 250mW (24dBm) | 11 dBm | 12dBm | 18dBm |
| UNII-3 (Upper) | 5.725-5.850 | Indoor-Outdoor | 1 W | 30 dBm/500kHz | Limited by Max of 1W | Limited by Max of 1W |
| | | | Mean e.i.r.p. limit [dBm] With TPC | Mean e.i.r.p. density limit [dBm/MHz] with TPC | | |
| ETSI 301 893 | 5.15-5.35 | | 23dBm | | | 17dBm |
| V1.7.0 | 5.470-5.735 | | 23dBm*3 | | | 17dBm*3 |

FIG. 17

| Country | Frequency (GHz) | the limit of the power spectral density (RMS-Avg) EIRP (dBm/MHz) | assuming 1.25MHz of bandwidth | assuming 5MHz of bandwidth |
|---|---|---|---|---|
| FCC | 2.4 | 33.2*1 | - | - |
| EU Countries | 2.4 | 10 | 11dBm | 17 dBm |
| Japan 20MHz | 2.4 | 12.14 | 13dBm | 19 dBm |
| Japan 40MHz | 2.4 | 9.13 | 10dBm | 16 dBm |
| S. Korea 20MHz | 2.4 | 10 | 11dBm | 17dBm |
| S. Korea 40MHz | 2.4 | 7 | 8dBm | 14 dBm |

FIG. 18

| Cases | | DC Tones | Guard Tones | Populated Tones | | Scaling Factor |
|---|---|---|---|---|---|---|
| | | | | # Tones | Tone Indices | |
| 20MHz | | -1, 0, 1 | -128:1:-123, 123:1:127 | 242 | -122:1:-2, 2:1:122 | 1 |
| 5MHz Localized | User 1 | -2, -1, 0, 1, 2 | -128:1:-123, 123:1:127 | 60 | -122:1:-63 | Sqrt(242/60) |
| | User 2 | | | 60 | -62:1:-3 | |
| | User 3 | | | 60 | 3:1:62 | |
| | User 4 | | | 60 | 63:1:122 | |
| 5MHz Distributed | User 1 | -2, -1, 0, 1, 2 | -128:1:-123, 123:1:127 | 60 | -122:4:-6, 3:4:119 | Sqrt(242/60) |
| | User 2 | | | 60 | -121:4:-5, 4:4:120 | |
| | User 3 | | | 60 | -120:4:-4, 5:4:121 | |
| | User 4 | | | 60 | -119:4:-3, 6:4:122 | |

FIG. 19

Out-of-Band and Spurious Emissions

Which out-of-band and spurious limits apply? [15.31(k)]
- 15.247 transmissions → 15.247(d)
- U-NII transmissions → 15.407(b)
  (-27 and -17 dBm/MHz limits are peak max-hold)
- Composite 15.247 and U-NII transmissions → Higher of 15.247(d) and 15.407(b)

Where do the limits apply?
- "Outside of the frequency bands of operation" [15.407(b)] except as noted in 15.407(b)(1) and (2) for U-NII bands 1 and 2.
- U-NII bands of operation are determined by 26-dB emission bandwidths [15.215(c) and 15.403(i)]

| U-NII 1 | U-NII 2 | U-NII 3 | U-NII 4 |
|---|---|---|---|
| | | | 15.247 |

FIG. 21

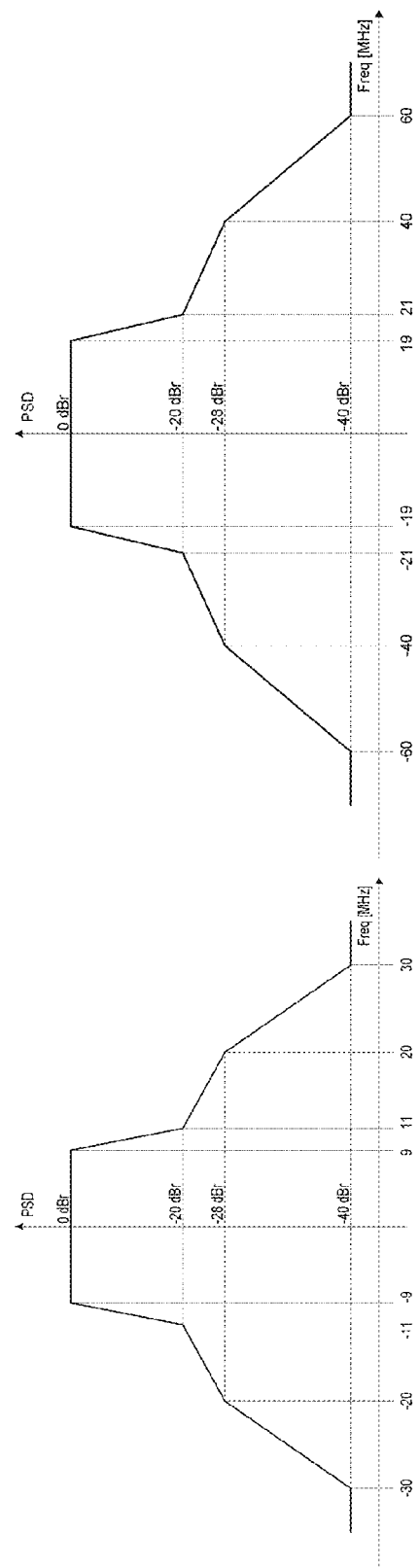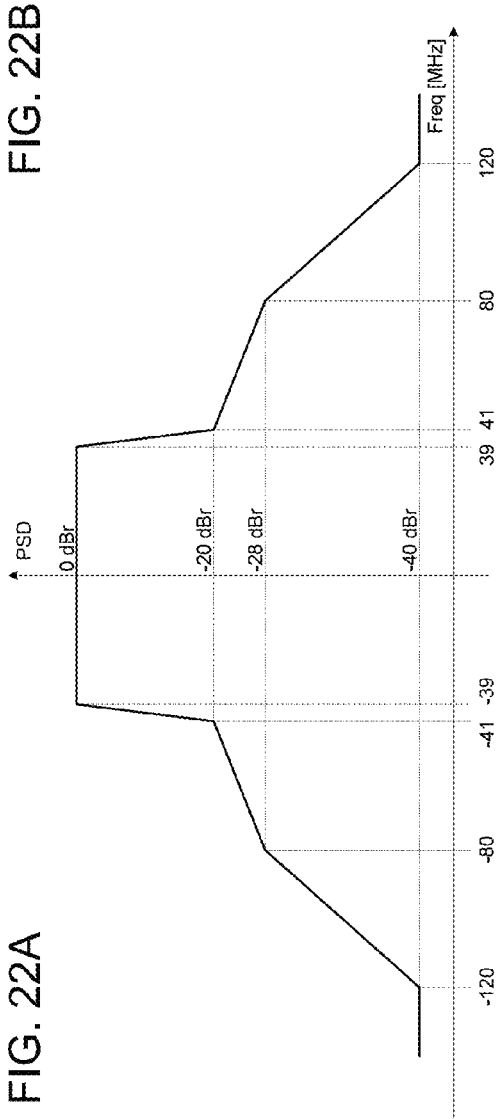

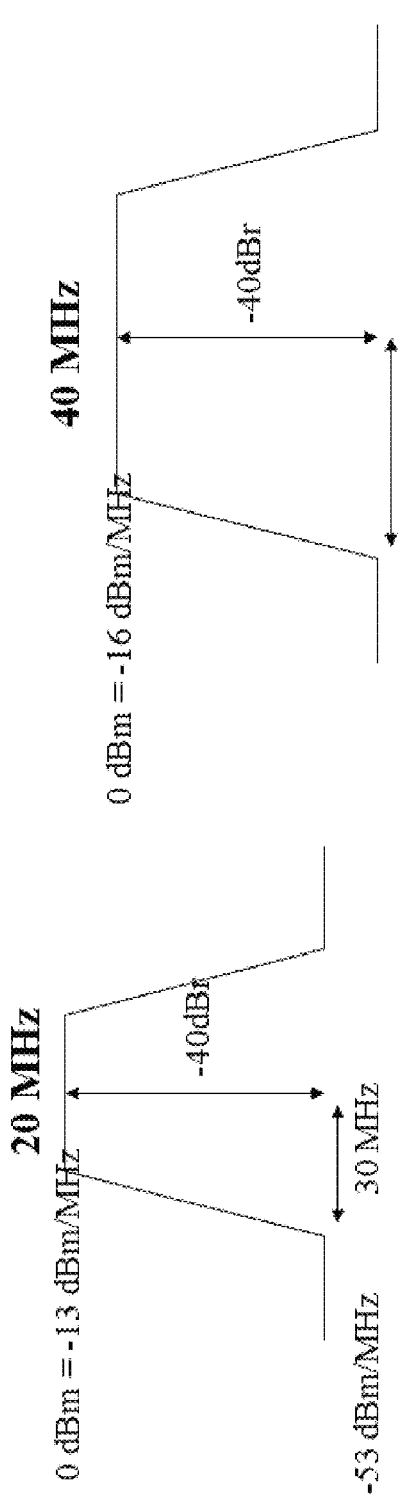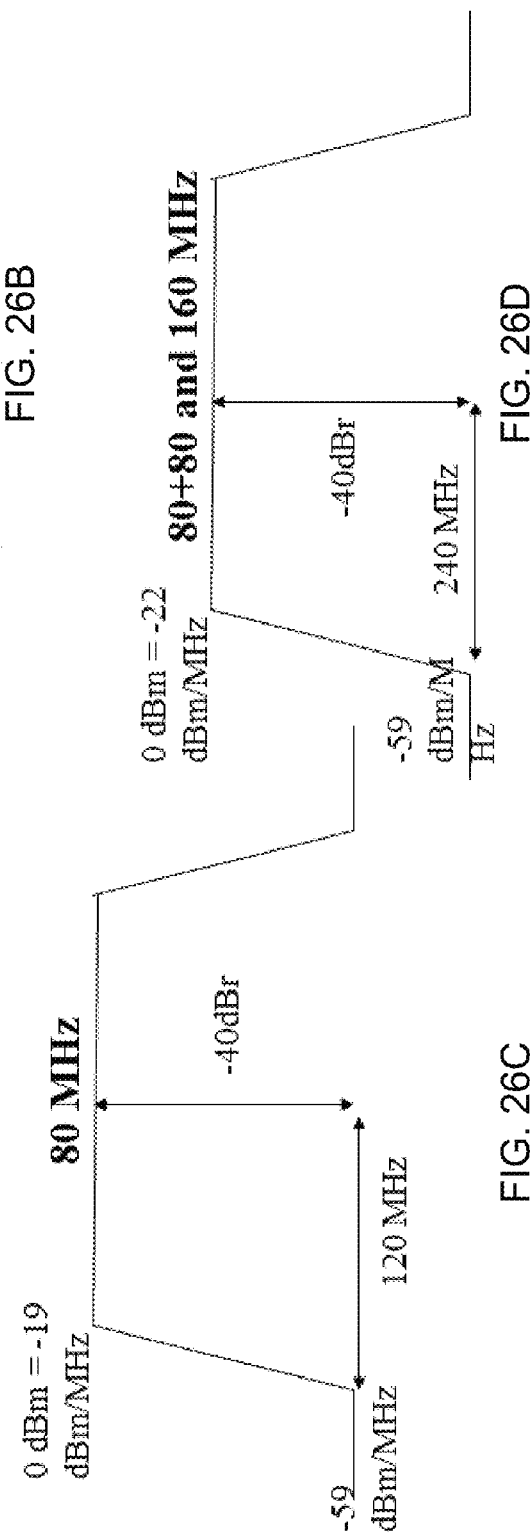
FIG. 26A
FIG. 26B
FIG. 26C
FIG. 26D

SYSTEMS AND METHODS FOR ALLOCATING TONES BETWEEN USERS IN WIRELESS COMMUNICATION SYSTEMS

PRIORITY CLAIM

This application claims the benefit of U.S. Provisional Application No. 62/048,758, filed Sep. 10, 2014, which is hereby incorporated herein by reference in its entirety.

FIELD

Certain aspects of the present disclosure generally relate to wireless communications, and more particularly, to methods and apparatus for allocating tones between users in wireless communication systems.

BACKGROUND

In many telecommunication systems, communications networks are used to exchange messages among several interacting spatially-separated devices. Networks can be classified according to geographic scope, which could be, for example, a metropolitan area, a local area, or a personal area. Such networks can be designated respectively as a wide area network (WAN), metropolitan area network (MAN), local area network (LAN), or personal area network (PAN). Networks also differ according to the switching/routing technique used to interconnect the various network nodes and devices (e.g., circuit switching vs. packet switching), the type of physical media employed for transmission (e.g., wired vs. wireless), and the set of communication protocols used (e.g., Internet protocol suite, SONET (Synchronous Optical Networking), Ethernet, etc.).

Wireless networks are often preferred when the network elements are mobile and thus have dynamic connectivity needs, or if the network architecture is formed in an ad hoc, rather than fixed, topology. Wireless networks employ intangible physical media in an unguided propagation mode using electromagnetic waves in the radio, microwave, infrared, optical, etc. frequency bands. Wireless networks advantageously facilitate user mobility and rapid field deployment when compared to fixed wired networks.

The devices in a wireless network can transmit/receive information between each other. Device transmissions can interfere with each other, and certain transmissions can selectively block other transmissions. Where many devices share a communication network, congestion and inefficient link usage can result. As such, systems, methods, and non-transitory computer-readable media are needed for improving communication efficiency in wireless networks.

SUMMARY

Various implementations of systems, methods and devices within the scope of the appended claims each have several aspects, no single one of which is solely responsible for the desirable attributes described herein. Without limiting the scope of the appended claims, some prominent features are described herein.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

In one aspect, a method of allocating tones between a plurality of wireless communication devices is provided. The method includes determining a tone allocation which divides a plurality of tones between the plurality of wireless communication devices. Determining the tone allocation includes determining one or more subbands, each subband including a subset of the plurality of tones. Determining the tone allocation further includes assigning a tone group size to a wireless communication device of the plurality of wireless communication devices within a subband of the one or more subbands. The tone group size indicates a number of contiguous tones that the wireless communication device can be allocated within the subband. The method further includes transmitting an indication of at least a portion of the tone allocation to the wireless communication device.

In various embodiments, each tone of the plurality of tones can be allocated to only one wireless communication device of the plurality of wireless communication devices, and the tone allocation can be used for one of an uplink or a downlink orthogonal frequency division multiple access message. In various embodiments, transmitting the indication of at least a portion of the tone allocation to the wireless communication device can include transmitting the indication in a header of a message. In various embodiments, transmitting the indication of at least a portion of the tone allocation to the wireless communication device can include transmitting the indication in a trigger message.

In various embodiments, the method can further include transmitting a downlink message to each of the plurality of wireless communication devices using the tone allocation. In various embodiments, the method can further include receiving an uplink message, transmitted by the wireless communication device using the tone allocation. In various embodiments, the subband can be assigned to two or more devices of the plurality of wireless communication devices.

In various embodiments, the tone group size can be one, the one or more subbands can include a single subband, and the tone allocation can assign tones to the wireless communication device within the single subband according to the tone group size. In various embodiments, the tone group size can be one, the one or more subbands can include a plurality of subbands, and the tone allocation can assign tones to the wireless communication device within each of the plurality of subbands according to the tone group size. In various embodiments, the tone group size can be greater than one, the one or more subbands can include a single subband, and the tone allocation can assign tones to the wireless communication device within the single subband according to the tone group size. In various embodiments, the tone group size can be greater than one, the one or more subbands can include a plurality of subbands, and the tone allocation can assign tones to the wireless communication device within each of the plurality of subbands according to the tone group size.

In various embodiments, the wireless communication device can be allocated every Nth tone within the subband, where N can be a number of wireless communication devices, of the plurality of wireless communication devices, that are assigned tones within the subband. In various embodiments, the wireless communication device can be allocated multiple contiguous tones according to the tone group size in every Nth tone group within the subband, where N can be a number of wireless communication devices, of the plurality of wireless communication devices, that are assigned tones within the subband. In various embodiments, each wireless communication device of the plurality of wireless communication devices can be assigned a tone group size and a subband of the plurality of subbands, and can be allocated every Nth tone group within the subband, where N can be a number of wireless communication devices, of the plurality of wireless communication devices, that are assigned tones within the subband.

Another aspect provides an apparatus configured to allocate tones between a plurality of wireless communication devices. The apparatus includes a memory that stores instructions. The apparatus further includes a processor coupled with the memory and configured to execute the instructions to determine a tone allocation which divides a plurality of tones between the plurality of wireless communication devices. The processor is configured to determine the tone allocation by determining one or more subbands, each subband including a subset of the plurality of tones. The processor is further configured to determine the tone allocation by assigning a tone group size to a wireless communication device of the plurality of wireless communication devices within a subband of the one or more subbands. The tone group size indicates a number of contiguous tones that the wireless communication device can be allocated within the subband. The apparatus further includes a transmitter configured to transmit an indication of at least a portion of the tone allocation to the wireless communication device.

In various embodiments, each tone of the plurality of tones can be allocated to only one wireless communication device of the plurality of wireless communication devices, and the tone allocation can be used for one of an uplink or a downlink orthogonal frequency division multiple access message. In various embodiments, the transmitter can be configured to transmit the indication of at least a portion of the tone allocation to the wireless communication device by transmitting the indication in a header of a message. In various embodiments, the transmitter can be configured to transmit the indication of at least a portion of the tone allocation to the wireless communication device by transmitting the indication in a trigger message.

In various embodiments, the transmitter can be further configured to transmit a downlink message to each of the plurality of wireless communication devices using the tone allocation. In various embodiments, the apparatus can further include a receiver configured to receive an uplink message, transmitted by the wireless communication device using the tone allocation. In various embodiments, the subband can be assigned to two or more devices of the plurality of wireless communication devices.

In various embodiments, the tone group size can be one, the one or more subbands can include a single subband, and the tone allocation can assign tones to the wireless communication device within the single subband according to the tone group size. In various embodiments, the tone group size can be one, the one or more subbands can include a plurality of subbands, and the tone allocation can assign tones to the wireless communication device within each of the plurality of subbands according to the tone group size. In various embodiments, the tone group size can be greater than one, the one or more subbands can include a single subband, and the tone allocation can assign tones to the wireless communication device within the single subband according to the tone group size. In various embodiments, the tone group size can be greater than one, the one or more subbands can include a plurality of subbands, and the tone allocation can assign tones to the wireless communication device within each of the plurality of subbands according to the tone group size.

In various embodiments, the wireless communication device can be allocated every Nth tone within the subband, where N can be a number of wireless communication devices, of the plurality of wireless communication devices, that are assigned tones within the subband. In various embodiments, the wireless communication device can be allocated multiple contiguous tones according to the tone group size in every Nth tone group within the subband, where N can be a number of wireless communication devices, of the plurality of wireless communication devices, that are assigned tones within the subband. In various embodiments, each wireless communication device of the plurality of wireless communication devices can be assigned a tone group size and a subband of the plurality of subbands, and can be allocated every Nth tone group within the subband, where N can be a number of wireless communication devices, of the plurality of wireless communication devices, that are assigned tones within the subband.

Another aspect provides another apparatus for allocating tones between a plurality of wireless communication devices. The apparatus includes means for determining a tone allocation which divides a plurality of tones between the plurality of wireless communication devices. Means for determining the tone allocation includes means for determining one or more subbands, each subband including a subset of the plurality of tones. Means for determining further includes means for assigning a tone group size to a wireless communication device of the plurality of wireless communication devices within a subband of the one or more subbands, wherein the tone group size indicates a number of contiguous tones that the wireless communication device can be allocated within the subband. The apparatus further includes means for transmitting an indication of at least a portion of the tone allocation to the wireless communication device.

In various embodiments, each tone of the plurality of tones can be allocated to only one wireless communication device of the plurality of wireless communication devices, and the tone allocation can be used for one of an uplink or a downlink orthogonal frequency division multiple access message. In various embodiments, means for transmitting the indication of at least a portion of the tone allocation to the wireless communication device can include means for transmitting the indication in a header of a message. In various embodiments, means for transmitting the indication of at least a portion of the tone allocation to the wireless communication device can include means for transmitting the indication in a trigger message.

In various embodiments, the apparatus can further include means for transmitting a downlink message to each of the plurality of wireless communication devices using the tone allocation. In various embodiments, the apparatus can further include means for receiving an uplink message, transmitted by the wireless communication device using the tone allocation. In various embodiments, the subband can be assigned to two or more devices of the plurality of wireless communication devices.

In various embodiments, the tone group size can be one, the one or more subbands can include a single subband, and the tone allocation can assign tones to the wireless communication device within the single subband according to the tone group size. In various embodiments, the tone group size can be one, the one or more subbands can include a plurality of subbands, and the tone allocation can assign tones to the wireless communication device within each of the plurality of subbands according to the tone group size. In various embodiments, the tone group size can be greater than one, the one or more subbands can include a single subband, and the tone allocation can assign tones to the wireless communication device within the single subband according to the tone group size. In various embodiments, the tone group size can be greater than one, the one or more subbands can include a plurality of subbands, and the tone allocation can assign tones to the wireless communication device within each of the plurality of subbands according to the tone group size.

In various embodiments, the wireless communication device can be allocated every Nth tone within the subband, where N can be a number of wireless communication devices, of the plurality of wireless communication devices, that are assigned tones within the subband. In various embodiments, the wireless communication device can be allocated multiple contiguous tones according to the tone group size in every Nth tone group within the subband, where N can be a number of wireless communication devices, of the plurality of wireless communication devices, that are assigned tones within the subband. In various embodiments, each wireless communication device of the plurality of wireless communication devices can be assigned a tone group size and a subband of the plurality of subbands, and can be allocated every Nth tone group within the subband, where N can be a number of wireless communication devices, of the plurality of wireless communication devices, that are assigned tones within the subband.

Another aspect provides a non-transitory computer readable storage medium. The medium includes computer executable instructions configured to implement a method for wireless communication. The method includes determining a tone allocation which divides a plurality of tones between the plurality of wireless communication devices. Determining the tone allocation includes determining one or more subbands, each subband including a subset of the plurality of tones. Determining the tone allocation further includes assigning a tone group size to a wireless communication device of the plurality of wireless communication devices within a subband of the one or more subbands. The tone group size indicates a number of contiguous tones that the wireless communication device can be allocated within the subband. The method further includes transmitting an indication of at least a portion of the tone allocation to the wireless communication device.

In various embodiments, each tone of the plurality of tones can be allocated to only one wireless communication device of the plurality of wireless communication devices, and the tone allocation can be used for one of an uplink or a downlink orthogonal frequency division multiple access message. In various embodiments, transmitting the indication of at least a portion of the tone allocation to the wireless communication device can include transmitting the indication in a header of a message. In various embodiments, transmitting the indication of at least a portion of the tone allocation to the wireless communication device can include transmitting the indication in a trigger message.

In various embodiments, the method can further include transmitting a downlink message to each of the plurality of wireless communication devices using the tone allocation. In various embodiments, the method can further include receiving an uplink message, transmitted by the wireless communication device using the tone allocation. In various embodiments, the subband can be assigned to two or more devices of the plurality of wireless communication devices.

In various embodiments, the tone group size can be one, the one or more subbands can include a single subband, and the tone allocation can assign tones to the wireless communication device within the single subband according to the tone group size. In various embodiments, the tone group size can be one, the one or more subbands can include a plurality of subbands, and the tone allocation can assign tones to the wireless communication device within each of the plurality of subbands according to the tone group size. In various embodiments, the tone group size can be greater than one, the one or more subbands can include a single subband, and the tone allocation can assign tones to the wireless communication device within the single subband according to the tone group size. In various embodiments, the tone group size can be greater than one, the one or more subbands can include a plurality of subbands, and the tone allocation can assign tones to the wireless communication device within each of the plurality of subbands according to the tone group size.

In various embodiments, the wireless communication device can be allocated every Nth tone within the subband, where N can be a number of wireless communication devices, of the plurality of wireless communication devices, that are assigned tones within the subband. In various embodiments, the wireless communication device can be allocated multiple contiguous tones according to the tone group size in every Nth tone group within the subband, where N can be a number of wireless communication devices, of the plurality of wireless communication devices, that are assigned tones within the subband. In various embodiments, each wireless communication device of the plurality of wireless communication devices can be assigned a tone group size and a subband of the plurality of subbands, and can be allocated every Nth tone group within the subband, where N can be a number of wireless communication devices, of the plurality of wireless communication devices, that are assigned tones within the subband.

BRIEF DESCRIPTION OF THE DRAWINGS

FIG. 8 is a table which illustrates tones which may be used by various users according to each of the five allocations.

FIG. 9 illustrates a comparison between a subband allocation and a distributed allocation, on the basis of seven different criteria.

FIG. 10 illustrates an intuitive comparison between each of the five allocation schemes, ranking each allocation scheme for each of seven aspects.

FIG. 15 is a chart illustration realistic gains which are possible when using subband OFDMA allocations rather than distributed allocations.

FIG. 16 illustrates a comparison between distributed and sub-band allocations on a number of different metrics.

FIG. 17 illustrates dBm per MHz considerations that may be taken into account for a transmission in the 5 GHz frequency range.

FIG. 18 illustrates dBm per MHz considerations that may be taken into account for a transmission in the 2.4 GHz frequency range.

FIG. 19 illustrates test cases which were used to generate the information found in FIGS. 17 and 18.

FIG. 21 illustrates which OOBE FCC may apply for various types of transmissions which may occur.

FIGS. 22A, 22B, and 22C illustrate spectral mask requirements for a 5 HGz band transmission in IEEE 802.11ac, for each of 20, 40, and 80 MHz transmissions, respectively.

FIGS. 26A-26D illustrates absolute out of band emissions for IEEE 802.11ac for each of 20, 40, 80, and 160 MHz.

DETAILED DESCRIPTION

Figure 1:
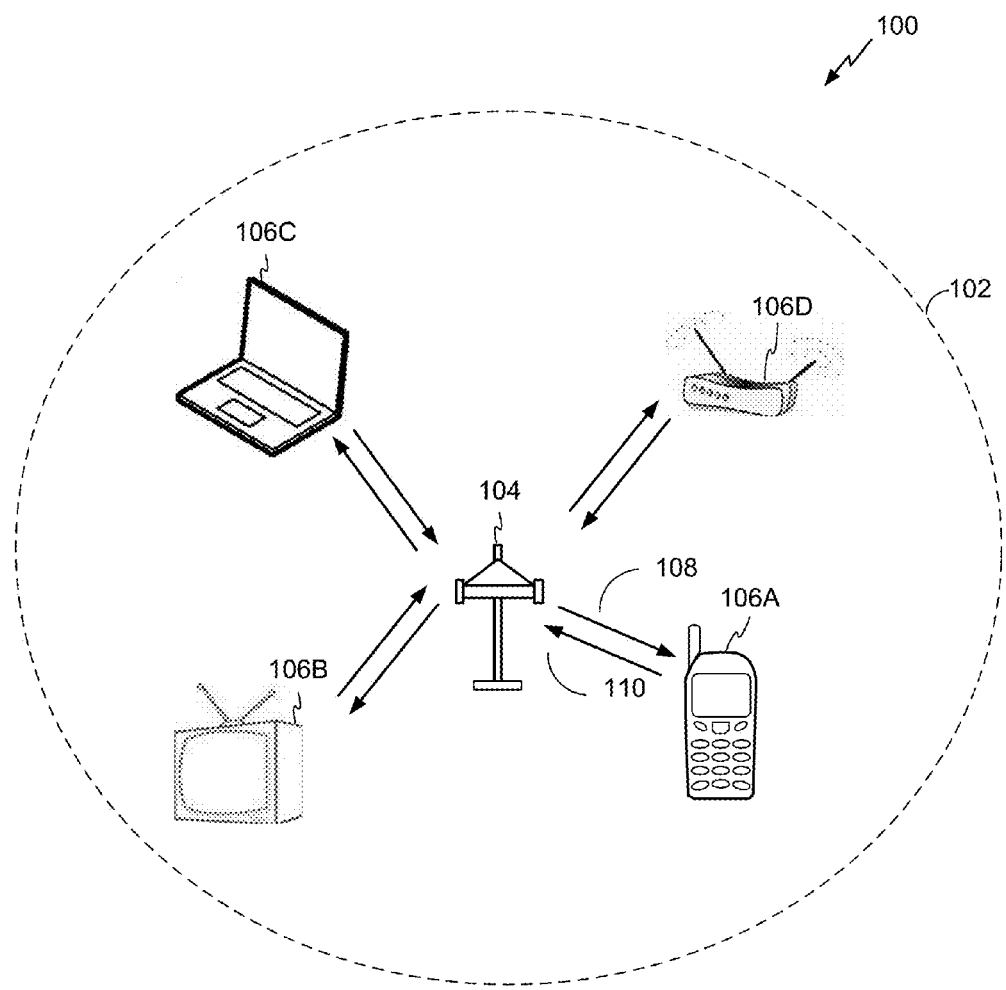
FIG. 1 illustrates an example of a wireless communication system in which aspects of the present disclosure can be employed.

Various aspects of the novel systems, apparatuses, and methods are described more fully hereinafter with reference to the accompanying drawings. The teachings disclosure can, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of or combined with any other aspect of the invention. For example, an apparatus can be implemented or a method can be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein can be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Implementing Devices

Wireless network technologies can include various types of wireless local area networks (WLANs). A WLAN can be used to interconnect nearby devices together, employing widely used networking protocols. The various aspects described herein can apply to any communication standard, such as Wi-Fi or, more generally, any member of the IEEE 802.11 family of wireless protocols.

In some aspects, wireless signals can be transmitted according to a high-efficiency 802.11 protocol using orthogonal frequency-division multiplexing (OFDM), direct—sequence spread spectrum (DSSS) communications, a combination of OFDM and DSSS communications, or other schemes.

In some implementations, a WLAN includes various devices which are the components that access the wireless network. For example, there can be two types of devices: access points ("APs") and clients (also referred to as stations, or "STAs"). In general, an AP serves as a hub or base station for the WLAN and an STA serves as a user of the WLAN. For example, a STA can be a laptop computer, a personal digital assistant (PDA), a mobile phone, etc. In an example, an STA connects to an AP via a Wi-Fi (e.g., IEEE 802.11 protocol such as 802.11ax) compliant wireless link to obtain general connectivity to the Internet or to other wide area networks. In some implementations an STA can also be used as an AP.

The techniques described herein can be used for various broadband wireless communication systems, including communication systems that are based on an orthogonal multiplexing scheme, such as Orthogonal Frequency Division Multiple Access (OFDMA). An OFDMA system utilizes orthogonal frequency division multiplexing (OFDM), which is a modulation technique that partitions the overall system bandwidth into multiple orthogonal sub-carriers. These sub-carriers can also be called tones, bins, etc.

The teachings herein can be incorporated into (e.g., implemented within or performed by) a variety of wired or wireless apparatuses (e.g., nodes). In some aspects, a wireless node implemented in accordance with the teachings herein can comprise an access point or an access terminal.

An access point ("AP") can comprise, be implemented as, or known as a NodeB, Radio Network Controller ("RNC"), eNodeB, Base Station Controller ("BSC"), Base Transceiver Station ("BTS"), Base Station ("BS"), Transceiver Function ("TF"), Radio Router, Radio Transceiver, Basic Service Set ("BSS"), Extended Service Set ("ESS"), Radio Base Station ("RBS"), or some other terminology.

A station ("STA") can also comprise, be implemented as, or known as a user terminal, an access terminal ("AT"), a subscriber station, a subscriber unit, a mobile station, a remote station, a remote terminal, a user agent, a user device, user equipment, or some other terminology. In some implementations an access terminal can comprise a cellular telephone, a cordless telephone, a Session Initiation Protocol ("SIP") phone, a wireless local loop ("WLL") station, a personal digital assistant ("PDA"), a handheld device having wireless connection capability, or some other suitable processing device connected to a wireless modem. Accordingly, one or more aspects taught herein can be incorporated into a phone (e.g., a cellular phone or smart phone), a computer (e.g., a laptop), a portable communication device, a headset, a portable computing device (e.g., a personal data assistant), an entertainment device (e.g., a music or video device, or a satellite radio), a gaming device or system, a global positioning system device, or any other suitable device that is configured to communicate via a wireless medium.

FIG. 1 illustrates an example of a wireless communication system 100 in which aspects of the present disclosure can be employed. The wireless communication system 100 can operate pursuant to a wireless standard, for example the 802.11ax standard. The wireless communication system 100 can include an AP 104, which communicates with STAs 106.

A variety of processes and methods can be used for transmissions in the wireless communication system 100 between the AP 104 and the STAs 106. For example, signals can be transmitted and received between the AP 104 and the STAs 106 in accordance with OFDMA techniques. If this is the case, the wireless communication system 100 can be referred to as an OFDMA system.

A communication link that facilitates transmission from the AP 104 to one or more of the STAs 106 can be referred to as a downlink (DL) 108, and a communication link that facilitates transmission from one or more of the STAs 106 to the AP 104 can be referred to as an uplink (UL) 110. Alternatively, a downlink 108 can be referred to as a forward link or a forward channel, and an uplink 110 can be referred to as a reverse link or a reverse channel.

The AP 104 can provide wireless communication coverage in a basic service area (BSA) 102. The AP 104 along with the STAs 106 associated with the AP 104 and that use the AP 104 for communication can be referred to as a basic service set (BSS). It should be noted that the wireless communication system 100 may not have a central AP 104, but rather can function as a peer-to-peer network between the STAs 106. Accordingly, the functions of the AP 104 described herein can alternatively be performed by one or more of the STAs 106.

Figure 2:
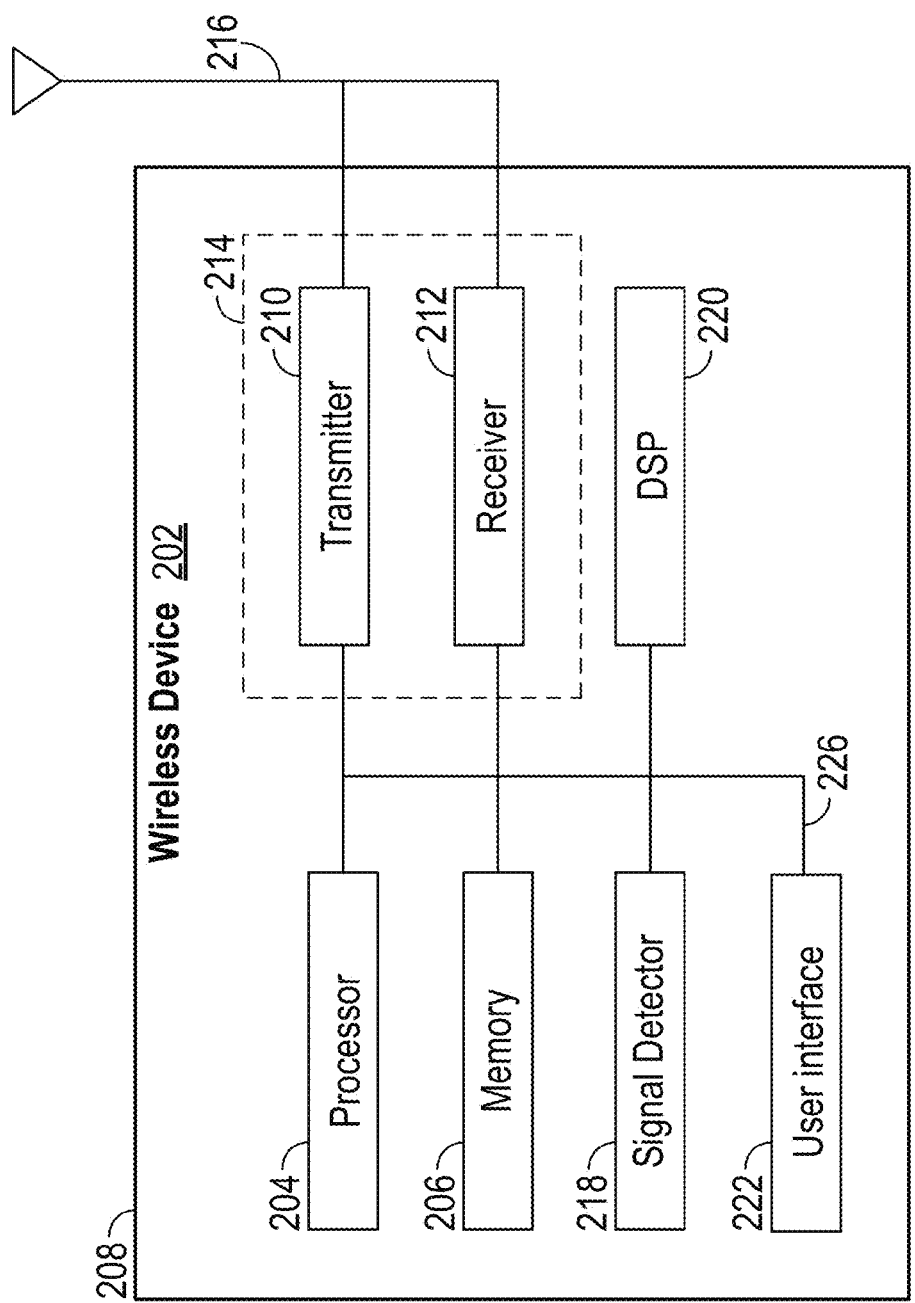
FIG. 2 illustrates various components that can be utilized in a wireless device that can be employed within the wireless communication system of FIG. 1.

FIG. 2 illustrates various components that can be utilized in a wireless device 202 that can be employed within the wireless communication system 100. The wireless device 202 is an example of a device that can be configured to implement the various methods described herein. For example, the wireless device 202 can comprise the AP 104 or one of the STAs 106.

The wireless device 202 can include a processor 204 which controls operation of the wireless device 202. The processor 204 can also be referred to as a central processing unit (CPU). Memory 206, which can include both read-only memory (ROM) and random access memory (RAM), provides instructions and data to the processor 204. A portion of the memory 206 can also include non-volatile random access memory (NVRAM). The processor 204 typically performs logical and arithmetic operations based on program instructions stored within the memory 206. The instructions in the memory 206 can be executable to implement the methods described herein.

The processor 204 can comprise or be a component of a processing system implemented with one or more processors. The one or more processors can be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing system can also include machine-readable media for storing software. Software shall be construed broadly to mean any type of instructions, whether referred to as software, firmware, middleware, microcode, hardware description language, or otherwise. Instructions can include code (e.g., in source code format, binary code format, executable code format, or any other suitable format of code). The instructions, when executed by the one or more processors, cause the processing system to perform the various functions described herein.

The wireless device 202 can also include a housing 208 that can include a transmitter 210 and a receiver 212 to allow transmission and reception of data between the wireless device 202 and a remote location. The transmitter 210 and receiver 212 can be combined into a transceiver 214. An antenna 216 can be attached to the housing 208 and electrically coupled to the transceiver 214. The wireless device 202 can also include (not shown) multiple transmitters, multiple receivers, multiple transceivers, and/or multiple antennas, which can be utilized during MIMO communications, for example.

The wireless device 202 can also include a signal detector 218 that can be used in an effort to detect and quantify the level of signals received by the transceiver 214. The signal detector 218 can detect such signals as total energy, energy per subcarrier per symbol, power spectral density and other signals. The wireless device 202 can also include a digital signal processor (DSP) 220 for use in processing signals. The DSP 220 can be configured to generate a data unit for transmission. In some aspects, the data unit can comprise a physical layer data unit (PPDU). In some aspects, the PPDU is referred to as a packet.

The wireless device 202 can further comprise a user interface 222 in some aspects. The user interface 222 can comprise a keypad, a microphone, a speaker, and/or a display. The user interface 222 can include any element or component that conveys information to a user of the wireless device 202 and/or receives input from the user.

The various components of the wireless device 202 can be coupled together by a bus system 226. The bus system 226 can include a data bus, for example, as well as a power bus, a control signal bus, and a status signal bus in addition to the data bus. Those of skill in the art will appreciate the components of the wireless device 202 can be coupled together or accept or provide inputs to each other using some other mechanism.

Although a number of separate components are illustrated in FIG. 2, those of skill in the art will recognize that one or more of the components can be combined or commonly implemented. For example, the processor 204 can be used to implement not only the functionality described above with respect to the processor 204, but also to implement the functionality described above with respect to the signal detector 218 and/or the DSP 220. Further, each of the components illustrated in FIG. 2 can be implemented using a plurality of separate elements.

As discussed above, the wireless device 202 can comprise an AP 104 or an STA 106, and can be used to transmit and/or receive communications. The communications exchanged between devices in a wireless network can include data units which can comprise packets or frames. In some aspects, the data units can include data frames, control frames, and/or management frames. Data frames can be used for transmitting data from an AP and/or a STA to other APs and/or STAs. Control frames can be used together with data frames for performing various operations and for reliably delivering data (e.g., acknowledging receipt of data, polling of APs, area-clearing operations, channel acquisition, carrier-sensing maintenance functions, etc.). Management frames can be used for various supervisory functions (e.g., for joining and departing from wireless networks, etc.).

Certain aspects of the present disclosure support allowing APs 104 to allocate STAs 106 transmissions in optimized ways to improve efficiency. Both high efficiency wireless (HEW) stations, stations utilizing an 802.11 high efficiency protocol (such as 802.11ax), and stations using older or legacy 802.11 protocols (such as 802.11b), can compete or coordinate with each other in accessing a wireless medium. In some embodiments, the high-efficiency 802.11 protocol described herein can allow for HEW and legacy stations to interoperate according to various OFDMA tone plans (which can also be referred to as tone maps). In some embodiments, HEW stations can access the wireless medium in a more efficient manner, such as by using multiple access techniques in OFDMA. Accordingly, in the case of apartment buildings or densely-populated public spaces, APs and/or STAs that use the high-efficiency 802.11 protocol can experience reduced latency and increased network throughput even as the number of active wireless devices increases, thereby improving user experience. In some embodiments, APs 104 can transmit on a wireless medium according to various DL tone plans for HEW STAs. For example, with respect to FIG. 1, the STAs 106A-106D can be HEW STAs. In some embodiments, the HEW STAs can communicate using a symbol duration four times that of a legacy STA. Accordingly, each symbol which is transmitted may be four times as long in duration. When using longer symbol durations, each of the individual tones may only require one-quarter as much bandwidth to be transmitted. For example, in various embodiments, a 1× symbol duration can be 3.2 ms and a 4× symbol duration can be 12.8 ms. The AP 104 can transmit messages to the HEW STAs 106A-106D according to one or more tone plans, based on a communication bandwidth. In some aspects, the AP 104 may be configured to transmit to multiple HEW STAs simultaneously, using OFDMA.

Tone Allocations Between Multiple Users in an OFDMA Transmission

In some aspects, OFDMA may allow a number of different devices to either transmit (in UL) or receive (in DL) information on a total bandwidth simultaneously. Generally, a bandwidth may include a certain number of tones. During an OFDMA transmission, each tone in a bandwidth may be allocated to up to one user. Each user in an OFDMA transmission may be allocated a certain number of tones, where those tones are allocated to that one particular user for the given transmissions, and not allocated to any other users. Accordingly, users in an OFDMA transmission do not typically share tones.

There may be a number of different ways to allocate tones between users in an OFDMA transmission. For example, a transmission may include a certain number of tones. Some of those tones may be used as guard tones and DC tones. The remainder of the tones may be allocated such that each tone is assigned to one, and only one, user. (It may also be possible that certain tones are not assigned to any user.) For example, certain tones may be designated as common pilot tones. These tones may be used as pilot tones for all the users of the OFDMA transmission. For example, in a DL OFDMA transmission, the transmitting device may use these tones as pilot tones, and each receiving device may receive the common pilot tones, and use those tones for channel estimation and other purposes. Accordingly, the tones which may be used as common pilot tones may not be assigned to any user. In certain transmissions, there may also be certain unused or unoccupied tones. For example, these tones may be unused due to a lack of queued data that needs to be transmitted on those tones, or due to the use of a tone plan which does not require that all of the available tones be used. Various tone allocations may have certain advantages over other tone allocations. Accordingly, when deciding upon a tone allocation, it may be beneficial to review a number of different options for tone allocations, and review the advantages and disadvantages of the various options.

Figure 3:
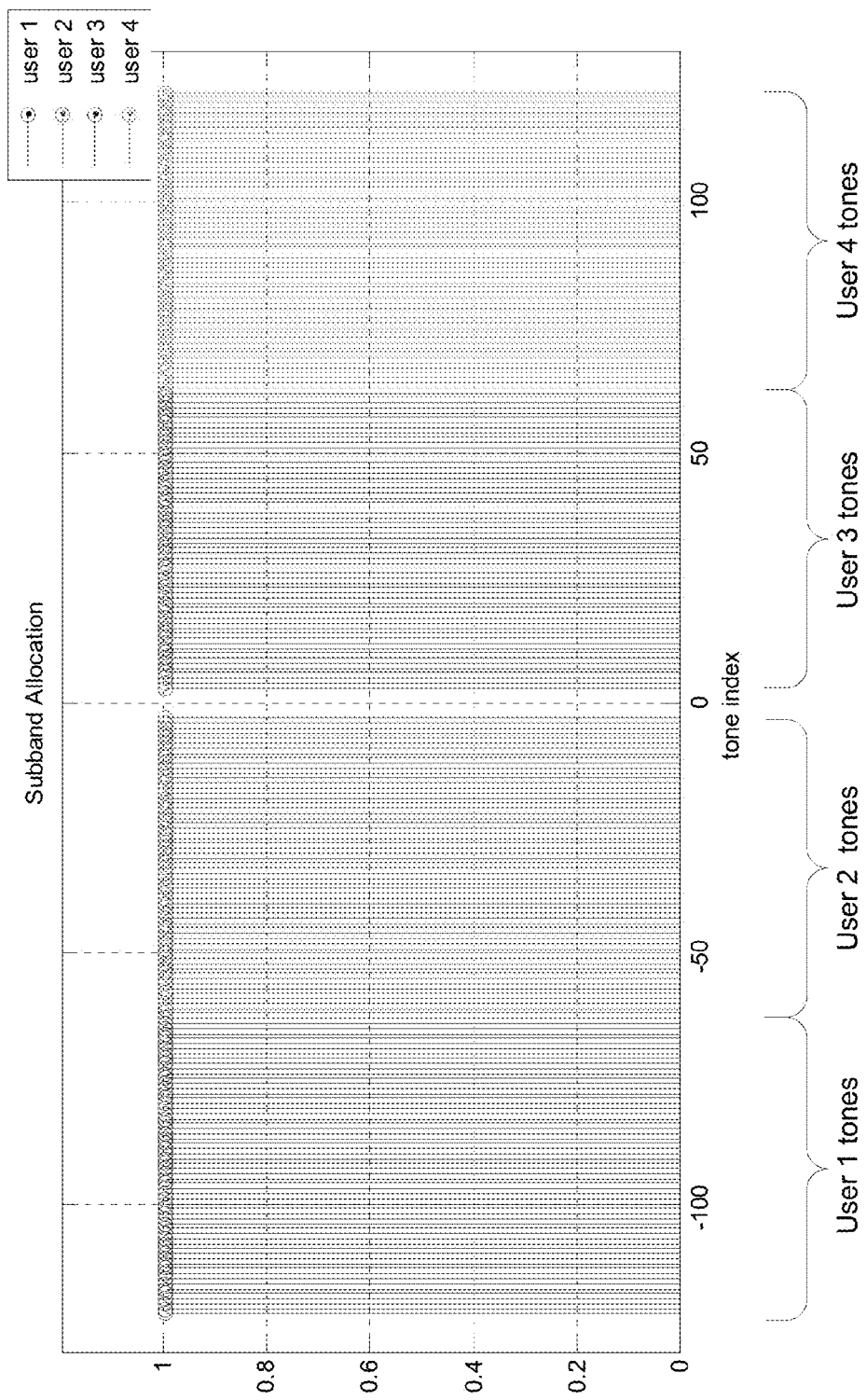
FIG. 3 illustrates an exemplary subband allocation which may be used according to some aspects of the present disclosure.

One option for allocating tones may be referred to as a subband allocation, which may also be referred to as a localized allocation. FIG. 3 illustrates an exemplary subband allocation which may be used according to some aspects of the present disclosure. In a subband allocation, the total bandwidth may be divided into a number of subbands. For example, in FIG. 3, the total bandwidth has been divided into four subbands. Each of those subbands is then assigned to a single user, and that user transmits (or receives) on each tone of that subband.

For example, in a 20 MHz transmission with a 4× symbol duration, there may be 11 guard tones and 5 DC tones. This may leave 240 tones for the various users to use, which may be used as pilot tones, data tones, or other tones (such as additional guard or DC tones). Accordingly, when these tones are divided between four users, as illustrated, each user may be assigned 60 tones. The tones of a transmission may be numbered from −128 to 127, with the usable tones being those numbered from −122 to −3, and from 3 to 122. Thus, for example, when assigning tones using a subband allocation, User 1 may be assigned each tone from −122 to −63, User 2 may be assigned each tone from −62 to −3, User 3 may be assigned each tone from 3 to 62, and User 4 may be assigned each tone from 63 to 122.

Accordingly, in a subband allocation, each user occupies a chunk of tones that form a contiguous frequency band. No other users' tones are located within that frequency band. However, unoccupied tones, such as DC tones or tones that carry common information (pilot tones, tones for control information), may be located within a user's tone allocation.

Figure 4:
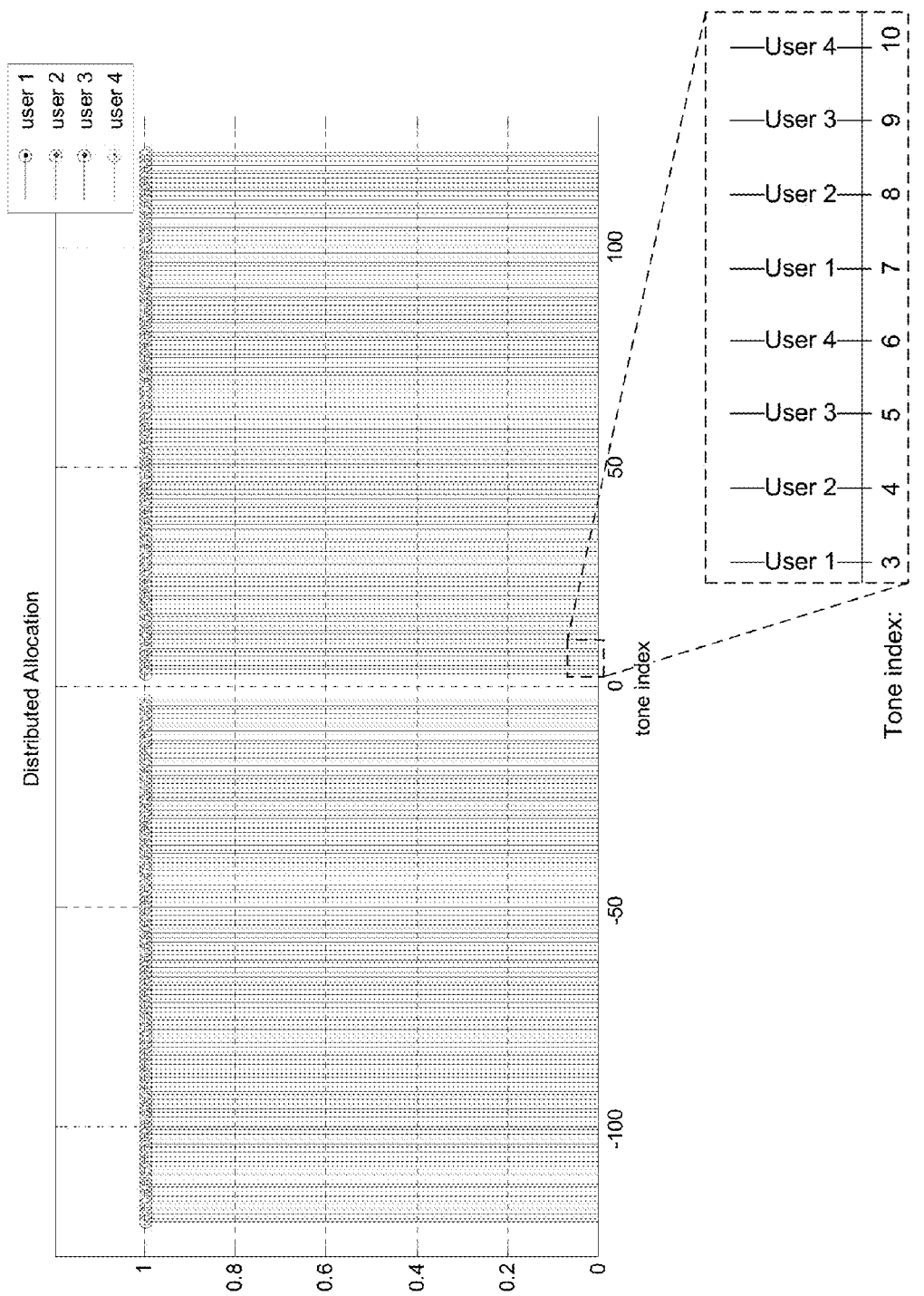
FIG. 4 is an exemplary illustration of a distributed allocation in which tones for a 20 MHz, 4× symbol duration transmission are allocated evenly between four users.

Another option for allocating tones to various users may be referred to as a distributed allocation. FIG. 4 is an exemplary illustration of a distributed allocation in which tones for a 20 MHz, 4× symbol duration transmission are allocated evenly between four users. Generally, in a distributed allocation, a user is allocated every Nth tone of all the usable tones, where N is the number of users in the allocation. Generally, the usable tones may be the tones which are not being used as guard tones, direct current tones, and common pilot tones. Note that, generally, each tone allocation discussed herein is allocating these "usable" tones, rather than allocating guard tones, DC tones, and common pilot tones. Accordingly, in a distributed allocation, a device may be allocated every Nth usable tone, which does not include those other tones. For example, as illustrated in FIG. 4, when there are four users in a distributed allocation, each user may be allocated every 4$^{th}$ tone. Distributed allocations have been used in the past in cellular networks using resource blocks rather than tones, but have not been used in networks which were built based on IEEE 802.11 protocols.

Generally, within the entire bandwidth of an OFDMA transmission allocated using a distributed allocation, one tone of every N populated or data tones are allocated to the a particular user, where N is the number of active OFDMA users. As noted above, these tones do not include DC tones, guard tones, and common pilot tones. As illustrated in FIG. 4, each user's tones span almost the entire bandwidth of the OFDMA transmission. It may be observed that if N is larger than 1, a single user may not transmit on two adjacent tones, as there may always be other user's tones between those of that user.

Figure 5:
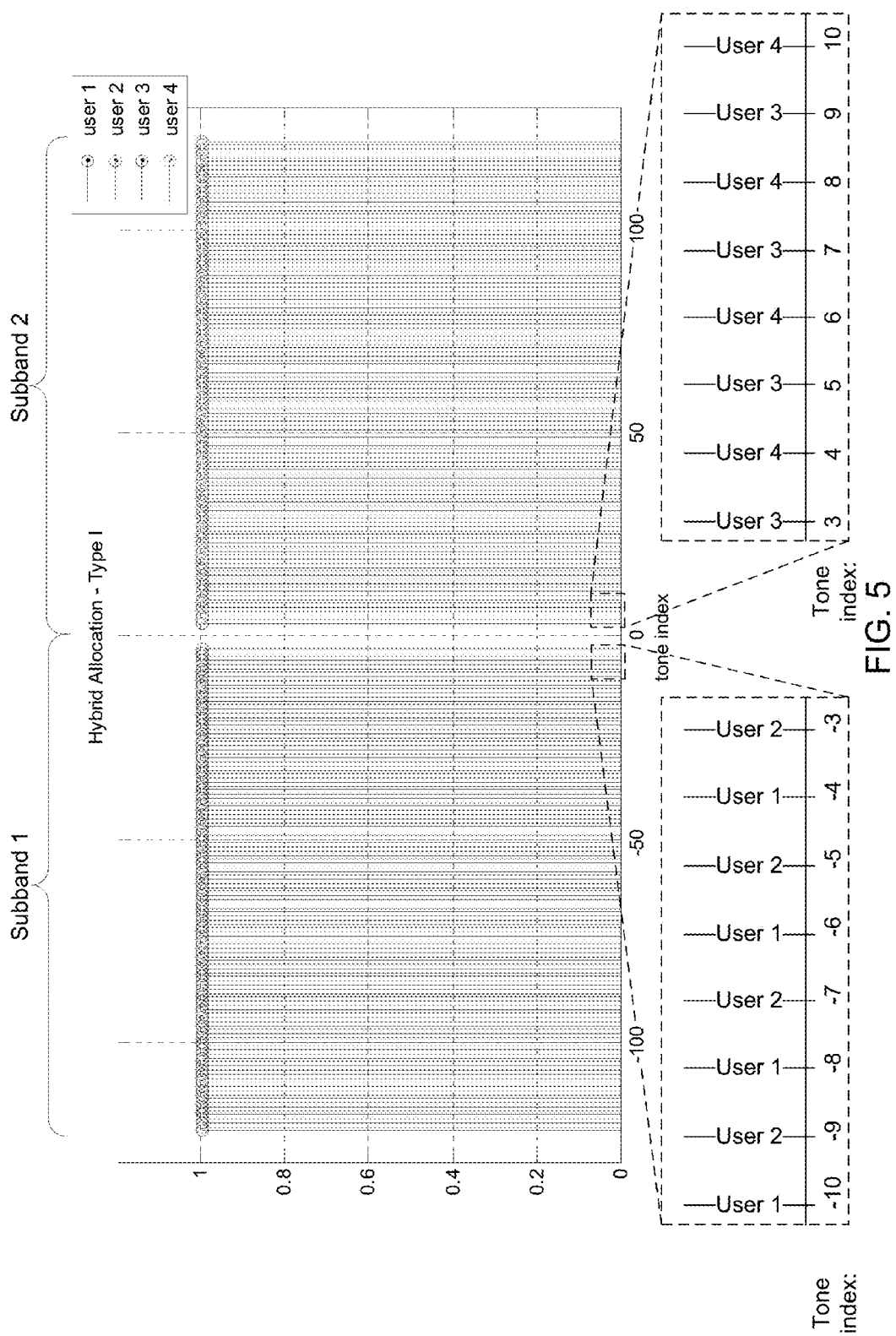
FIG. 5 is an exemplary illustration of a hybrid allocation which may be used to allocate tones in an OFDMA transmission.

FIG. 5 is an exemplary illustration of a hybrid allocation which may be used to allocate tones in an OFDMA transmission. In some aspects, this allocation may be referred to as a "Type 1" hybrid allocation. As with previous illustrations, this illustrates four users equally sharing a 20 MHz, 4× symbol duration transmission. In this allocation, the entire bandwidth may be divided in B subbands. Active OFDMA users may also be divided into B mutually-exclusive groups. Each group of users may transmit on one subband, using a distributed allocation. That is, if N users are allocated to transmit on a particular subband, each of those N users may transmit on every Nth tone of the subband. As illustrated here, the tones may be divided into two allocations, with two users sharing the tones of each allocation. Accordingly, each user may transmit on every second tone of their assigned subband, rather than transmitting across the entire bandwidth.

Note that, generally, each subband does not need to have the same bandwidth. For example, one subband may be larger than another subband, and more or fewer subband may be used. Further, each subband does not need to have the same number of users. Further, note that if only one subband is used, this allocation may be equivalent to a distributed allocation. Further, if each subband contains only one user (for example, if there are four subbands, and each subband is assigned to a single user), this Type-I hybrid allocation may be equivalent to the subband (localized) allocation discussed above.

Figure 6:
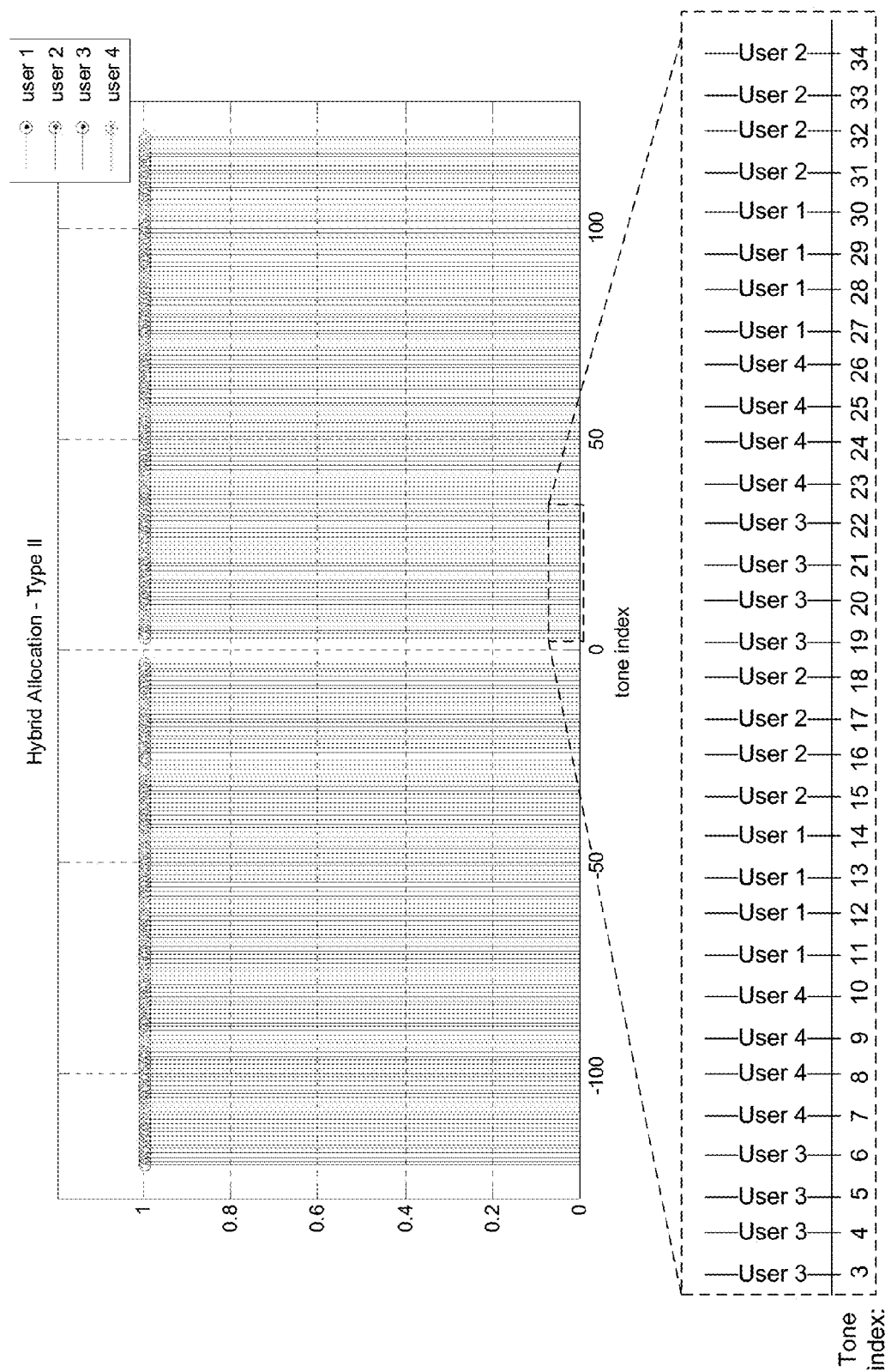
FIG. 6 is an exemplary illustration of another hybrid allocation which may be used to allocate tones in an OFDMA transmission.

FIG. 6 is an exemplary illustration of another hybrid allocation which may be used to allocate tones in an OFDMA transmission. In some aspects, this allocation may be referred to as a "Type 2" hybrid allocation. Within the entire bandwidth of the OFDMA transmission, a user is allocated every Nth populated/data tone block, where N is the number of active OFDMA users. Each tone block may include a number of contiguous populated/data tones. Here, a tone block may include T tones for each of the N users. As illustrated in FIG. 6, T may be 4 tones, or may be another number of tones. Note that the tone block sizes could be different for different users. For example, if one device is allocated twice as much bandwidth as another device, that device may have a tone block that is twice the number of tones. In this hybrid allocation, each user's tones span almost the entire bandwidth of the OFDMA transmission. Note that if N is larger than one, each tone block from a particular device may not neighbor another tone block from the same device, but will instead neighbor tone blocks from other devices.

Also note that, if the tone block size for each device is one, this hybrid allocation is equivalent to a distributed allocation. Further, if the tone block size for each device is equal to the number of tones allocated to that device, this hybrid allocation may be equivalent to to the subband allocation, discussed above.

Figure 7:
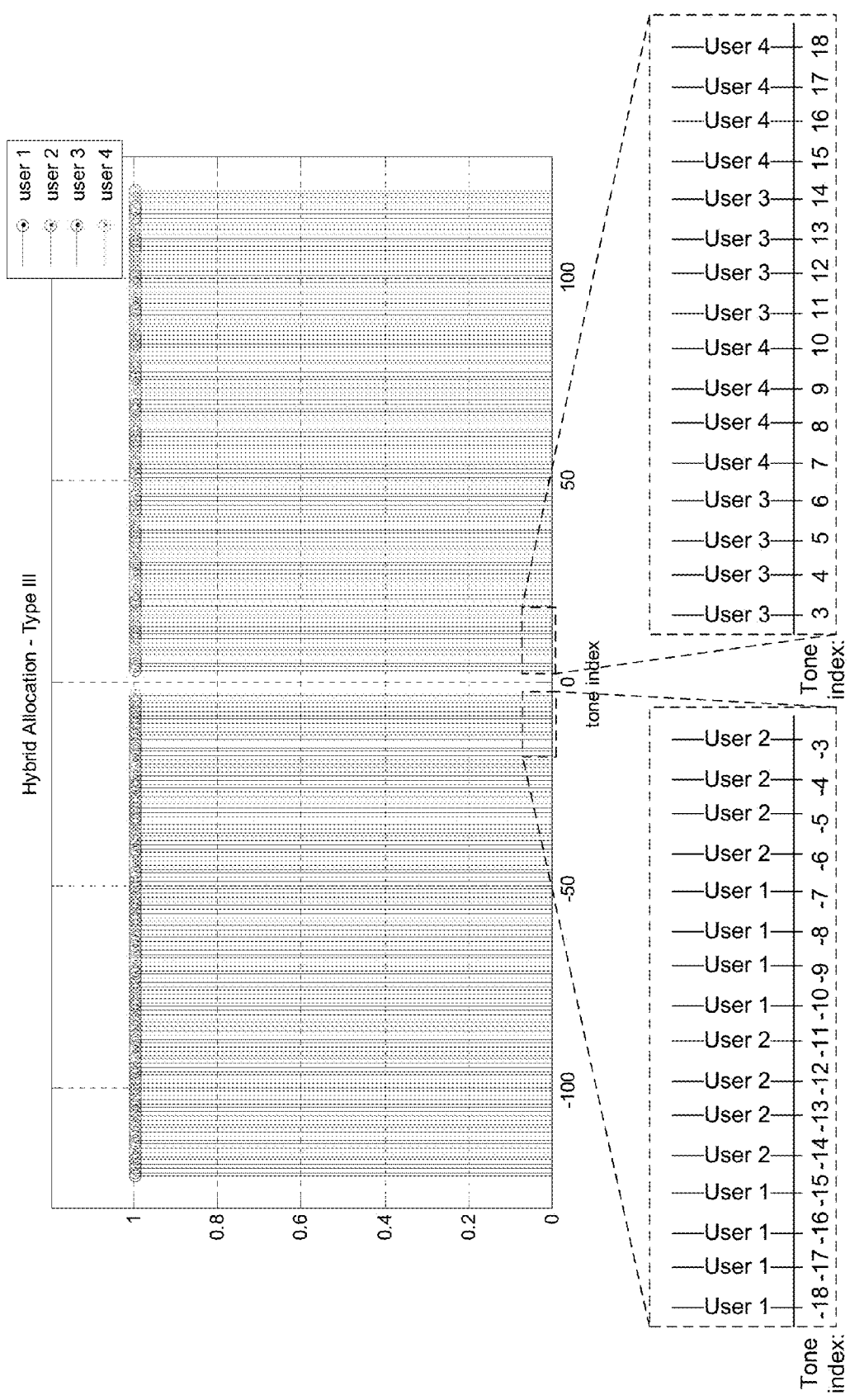
FIG. 7 is an exemplary illustration of another hybrid allocation which may be used to allocate tones in an OFDMA transmission.

FIG. 7 is an exemplary illustration of another hybrid allocation which may be used to allocate tones in an OFDMA transmission. In some aspects, this allocation may be referred to as a "Type 3" hybrid allocation. This hybrid allocation may, in some aspects, be the most general of the allocations. In this hybrid allocation, the entire bandwidth may be divided into B subbands. Active OFDMA users may be divided into B mutually exclusive groups, and each of these groups may be assigned to one and only one subband. With each subband, N users may be assigned to transmit on that subband. Each of those N users may transmit on every Nth tone group. As before, tone groups may include T contiguous tones. However, the tone group size for each user need not be identical to the tone group size for other users. For example, a user which is assigned more bandwidth may have larger tone groups than other users, which were assigned fewer tones. Further, note that each subband may not have the same number of users as each other subband. For example, devices which are assigned more bandwidth may be assigned subbands which have fewer devices than devices which are assigned less bandwidth.

Note that, when the tone block size for all users is 1, this allocation becomes equivalent to the Type 1 hybrid allocation of FIG. 5. Further, when the number of subbands is 1, this tone allocation becomes equivalent to the Type 2 hybrid allocation of FIG. 6.

Thus, generally, five different allocations are proposed, including a subband (or called localized) allocation, a distributed allocation, and three different hybrid allocations. A Type 1 hybrid allocation is a distributed allocation with different subbands, while a Type 2 hybrid allocation is a distributed allocation in the entire bandwidth of a transmission, but distributed in groups rather than individual tones. Finally, a Type 3 hybrid allocation combines the groups of a Type 2 allocation with the sub-bands of a Type 1 hybrid allocation.

FIG. 8 is a table which illustrates tones which may be used by various users according to each of the five allocations. These tones are based upon using a 20 MHz transmission with 4× symbol duration. Such a transmission may use a 256 FFT size, with indices [−128:1:127]—that is, indices from −128 to 127, incrementing by 1. Such an allocation may include 11 guard tones, with indices [−128:1:−123, 123:1:127]. That is, indices from −128 to −123 with increments of 1, and from indices 123 to 127 with increments of 1, may be guard tones. 5 direct current (DC) tones may occupy indices [−2:1:2]. Accordingly, the remaining 240 tones may be divided between the four OFDMA users in these exemplary allocations. Thus, the table of FIG. 8 illustrates the tones assigned to each users in each of the five tone allocations illustrated in FIGS. 3-7.

FIG. 9 illustrates a comparison between a subband allocation and a distributed allocation, on the basis of seven different criteria. Generally, a distributed tone allocation may perform better with regards to meet Transmittor Power Limits. Such limits may mean that a particular transmitting device should only transmit using a certain power, over a certain bandwidth. For example, there may be a maximum transmission power, for each device, for each 1 MHz of bandwidth. Accordingly, because a distributed allocation allows a device to more evenly space out its transmissions over the entire bandwidth of an OFDMA transmission (rather than having all its transmissions be in a single subband), such as allocation may ensure it is harder to violate a Tx Power Limit.

However, subband allocations may be more desirable with regards to frequency selective scheduling gain and channel smoothing. For example, certain devices may be able to transmit or receive on certain frequency bands, relative to other bands. Accordingly, when using subband allocations, those devices may be assigned to transmit or receive on bands which they work more effectively. However, with a distributed allocation, this may not be possible. Similarly, channel smoothing, in which the gain of each channel of a user may be increased due to proximity to other channels transmitted by that user, may favor subband allocations.

With regards to out of bounds emissions and spectral mask requirements, a distributed allocation may need some extra back-off as compared to a subband tone allocation, because a distributed allocation may have more emissions outside of its band than a subband tone allocation.

With regards to leakage to adjacent OFDMA tones, distributed allocations may be better. For example, a device transmitting on a given tone may "leak" some power to adjacent tones. When a device is transmitting on a number of neighboring tones, this leakage may be additive. Thus, in a subband allocation, the devices may leak a much larger amount of power into adjacent OFDMA tones.

Allocations may also be evaluated with respect to blocking to adjacent channels. For example, an adjacent channel interferer may be the OFDMA signal. With a distributed OFDMA allocation, the impact of such interference should be similar to a non-OFDMA transmission of the same bandwidth. With a subband OFDMA interferer, the impact may depend on the subband location. For example, simulations may be needed to quantify the worst case blocking performance degradation.

In some aspects, regulatory considerations may also be considered when choosing an allocation. For example, the European Telecommunications Standards Institute (ETSI) has a number of rules which may affect wireless communications. For example, some key rules may include:

The Nominal Channel Bandwidth shall be at least 5 MHz at all times

The Occupied Channel Bandwidth shall be between 80% and 100% of the declared Nominal Channel Bandwidth. In case of smart antenna systems (devices with multiple transmit chains) each of the transmit chains shall meet this requirement During an established communication in which a device operates with a Nominal Channel Bandwidth mode of 40 MHz or more, the device is allowed to operate temporarily with an Occupied Channel Bandwidth below 80% of its Nominal Channel Bandwidth with a minimum of 16 MHz.

These rules would seem to indicate that any bandwidth below 5 MHz in an UL OFDMA transmission would only be possible when using a distributed allocation or a Type-II hybrid allocation, since each device must transmit on at least 80% of the occupied bandwidth. However, it should be noted that ETSI has altered their rules twice in the past to allow for a 20 MHz transmission in a 40 MHz BSS for IEEE 802.11n, and to allow for a 20 MHz transmission in an 80 MHz BSS for IEEE 802.11ac. Accordingly, these rules may again be altered. However, generally, there may be less regulatory risk to use a distributed allocation, as is used in LTE-U (long term evolution in an unlicensed band). Accordingly, regulatory risk may favor the use of a distributed allocation.

Note that each of the illustrated tone allocations here may be used with any tone plan. For example, these tone allocations may be used with tone plans for either 1× or 4× symbol duration, and may be used with a number of different possible tone plans. Note that if a tone plan uses common pilot tones for all users, such as in DL, the allocation schemes described herein may be applied to the data tones only, rather than to the common pilot tones. If dedicated pilot tones are provided for each user, the allocation schemes may be applied to populated tones which include both data and pilot tones.

Further, the tone allocation schemes described herein may be independent from the tone plans, and from BCC (binary convolution code) interleaving and LDPC (low density parity check) tone mapping. This means that any choice of tone plans, BCC interleaving and LDPC tone mapping could use anyone of the aforementioned tone allocation schemes. For example, a tone plan with X tones formed from one allocations may use a two-level mapping in BCC interleaving an LDPC tone mapping. The first level may include a virtual index mapping to perform the BCC interleaving/LDPC tone mapping of X tones. The second level may map the outputs from 1st level to the tone indices defined by the allocation scheme. A tone plan with X tones formed from two or more tone plans combined (such as a user which is assigned a larger bandwidth than other users) may also use a two-level mapping in BCC interleaving an LDPC tone mapping. The first level may include a virtual index mapping to perform the BCC interleaving/LDPC tone mapping for each tone plan. At a second level, all outputs from the 1st level generated from all tone plans may be mapped to the tone indices defined by the allocation scheme.

In light of the comparison between the subband (also called localized) allocation and distributed allocation, FIG. 10 illustrates an intuitive comparison between each of the five allocation schemes, ranking each allocation scheme for each of seven aspects. Note that these comparisons are merely exemplary. In some aspects, further testing may be done to verify these results. Generally, in this table, if two schemes are said to be approximately equal "≈," this means that the schemes may have similar performance characteristics, and further numerical study may be needed to compare the subtle differences between the schemes. In some aspects, performance in each of these aspects may be used, at least in part, to help determine which of the allocations may be best.

Each of the allocations may be compared using a number of different factors, including Tx power due to PSD limit, OOBE and mask compliance, leakage across different OFDMA users, blocking, sub-band selection gain, smoothing gain, impact to spec, and regulatory considerations.

Figure 11B:
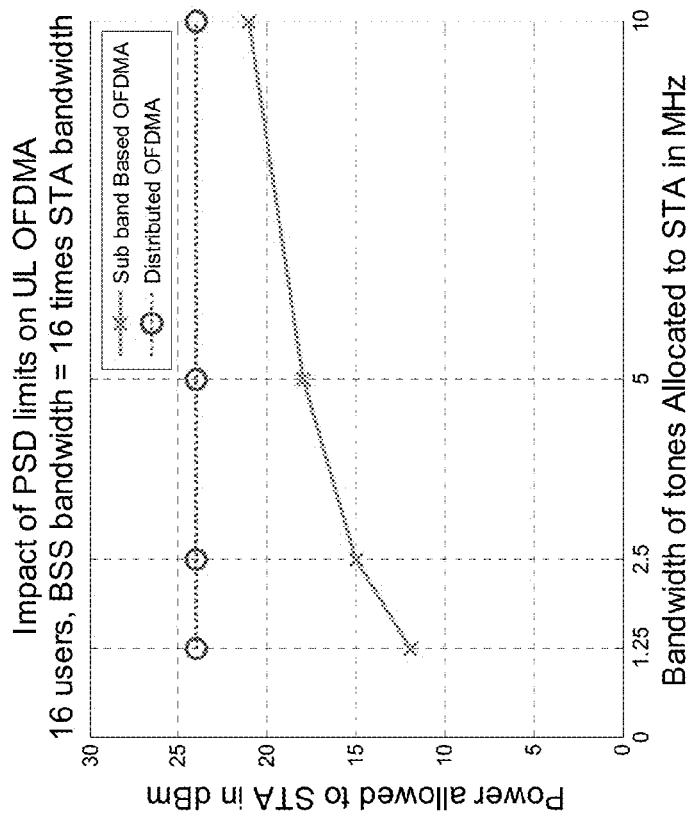
FIGS. 11A and 11B illustrate the transmission power advantage that distributed allocations may have over sub-band allocations.
Figure 11A:
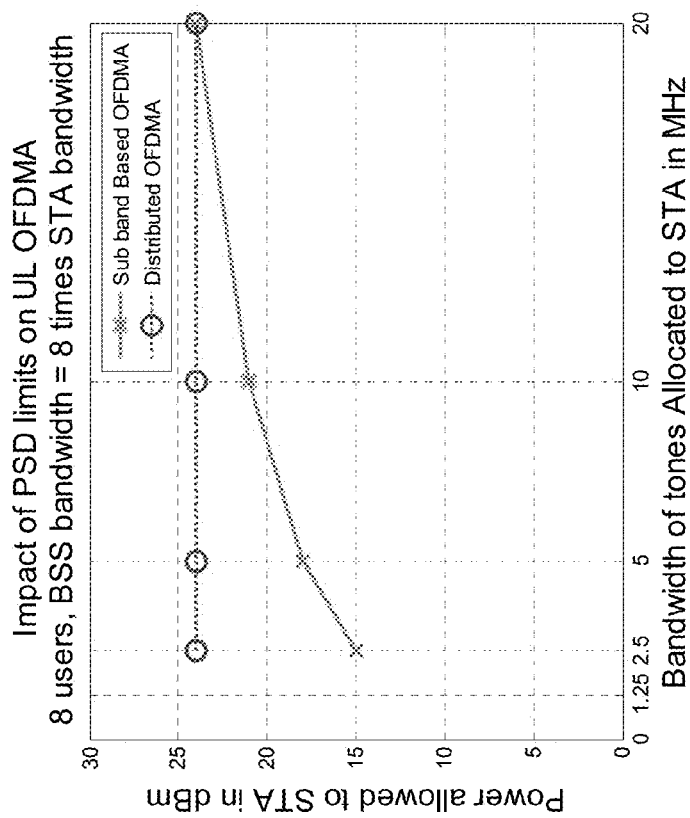

FIGS. 11A and 11B illustrate the transmission power advantage that distributed allocations may have over subband allocations. Generally, a power limit may be defined with a 1 MHz resolution. That is, a device may be permitted to transmit using a certain power across each 1 MHz portion of the bandwidth. In a distributed allocation, having tones spread across the entire band makes it more difficult to violate these limits. For example, there may be a total power limit of 24 dBm, and a further power limit of 11 dBm/MHz. FIGS. 11A and 11B illustrate the impacts of these particular limits on the power that a STA may be allowed to use in an UL OFDMA transmission. As illustrated in these figures, a STA may be able to transmit using more power in a distributed allocation, for any tone bandwidth, whether there are 8 users or 16 users. Accordingly, with respect to transmission power limits, a distributed allocation may be preferable over a subband allocation.

Figure 12:
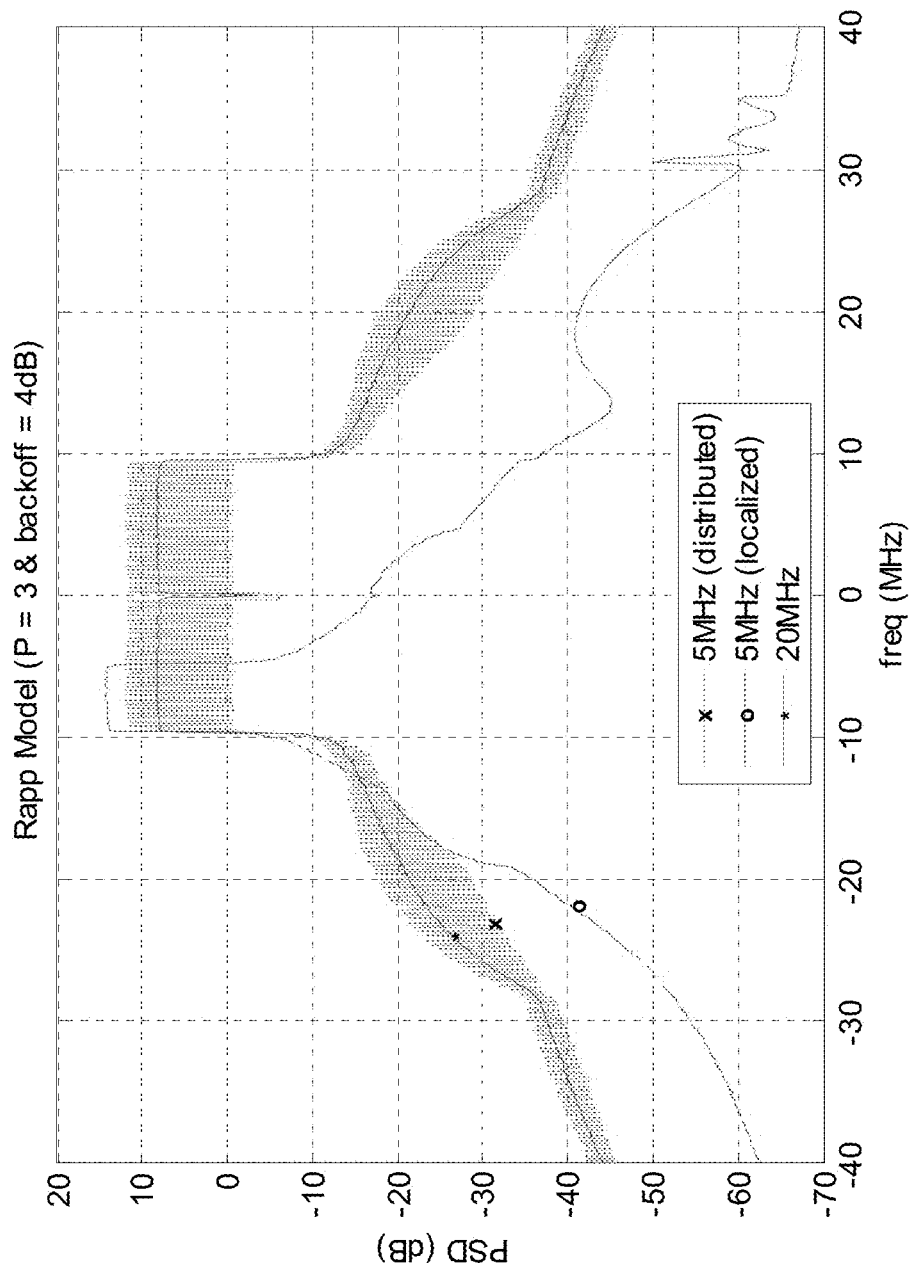
FIG. 12 illustrates a power spectral density plot for a distributed allocation and a subband allocation, when both are transmitted using the same power.

FIG. 12 illustrates a power spectral density plot for a distributed allocation and a subband allocation, when both are transmitted using the same power. This power spectral density plot contains a resolution bandwidth (RBW) of 78.125 kHz. The tone spacing used here is based on a 4× symbol duration compared to other IEEE 802.11 protocols. In this plot, close to 100 kHz RBW used for 11ac measurement. Generally, in a distributed transmission, slightly higher spikes may be observed compared to a 20 MHz transmission. In a subband transmission, a higher power spectral density may be observed in the band allocated to the user, and in areas less than or equal to 3 MHz out of band. Thus, generally it may be observed that when transmitting using the same power, a subband allocation contains a higher peak power spectral density.

Figure 13A:
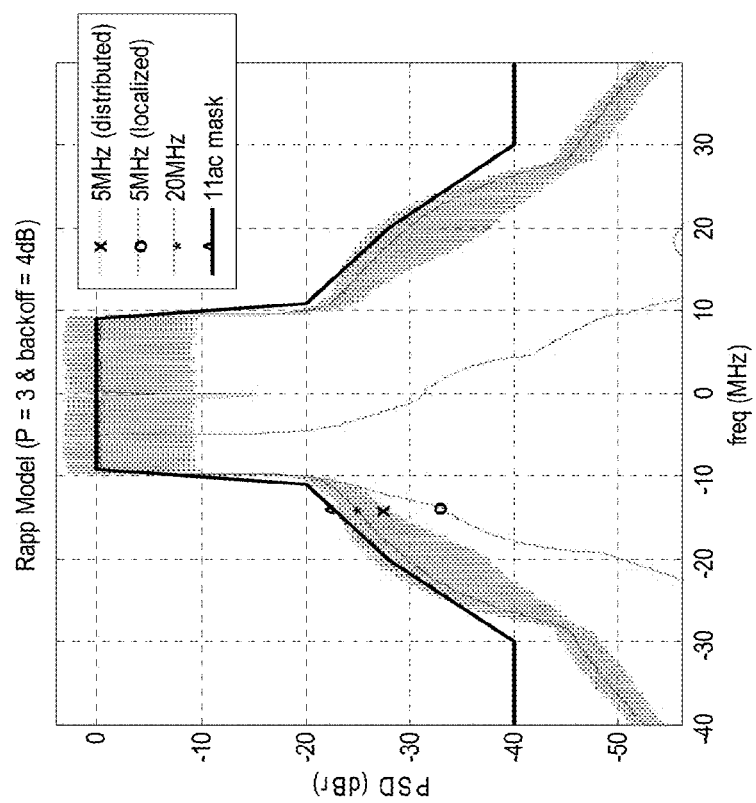
FIGS. 13A and 13B are illustrations of power spectral density plots for distributed and subband allocations, illustrating spectral mask compliance.
Figure 13B:
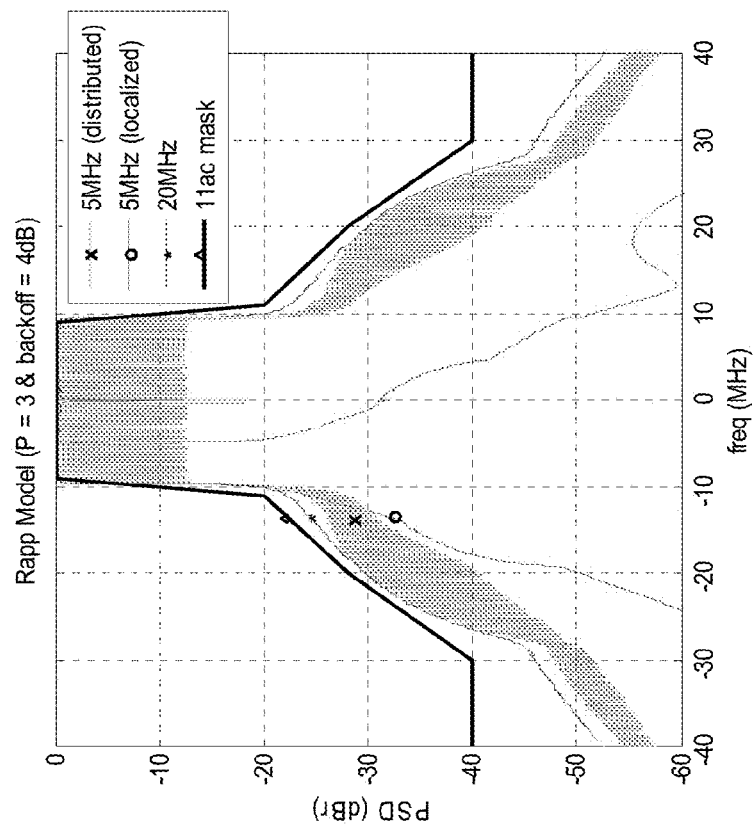

FIGS. 13A and 13B are illustrations of power spectral density plots for distributed and subband allocations, illustrating spectral mask compliance. In each of these plots, the signals are normalized by their in-band peak power spectral density (PSD). This in-band peak PSD measured with RBW of 78.125 kHz (FIG. 13A) or 1 MHz (FIG. 13B). In each of these plots, the spectral mask for IEEE 802.11ac is illustrated, which may be tighter than the requirements of the FCC and other regulatory bodies.

Figures 14A, 14B:
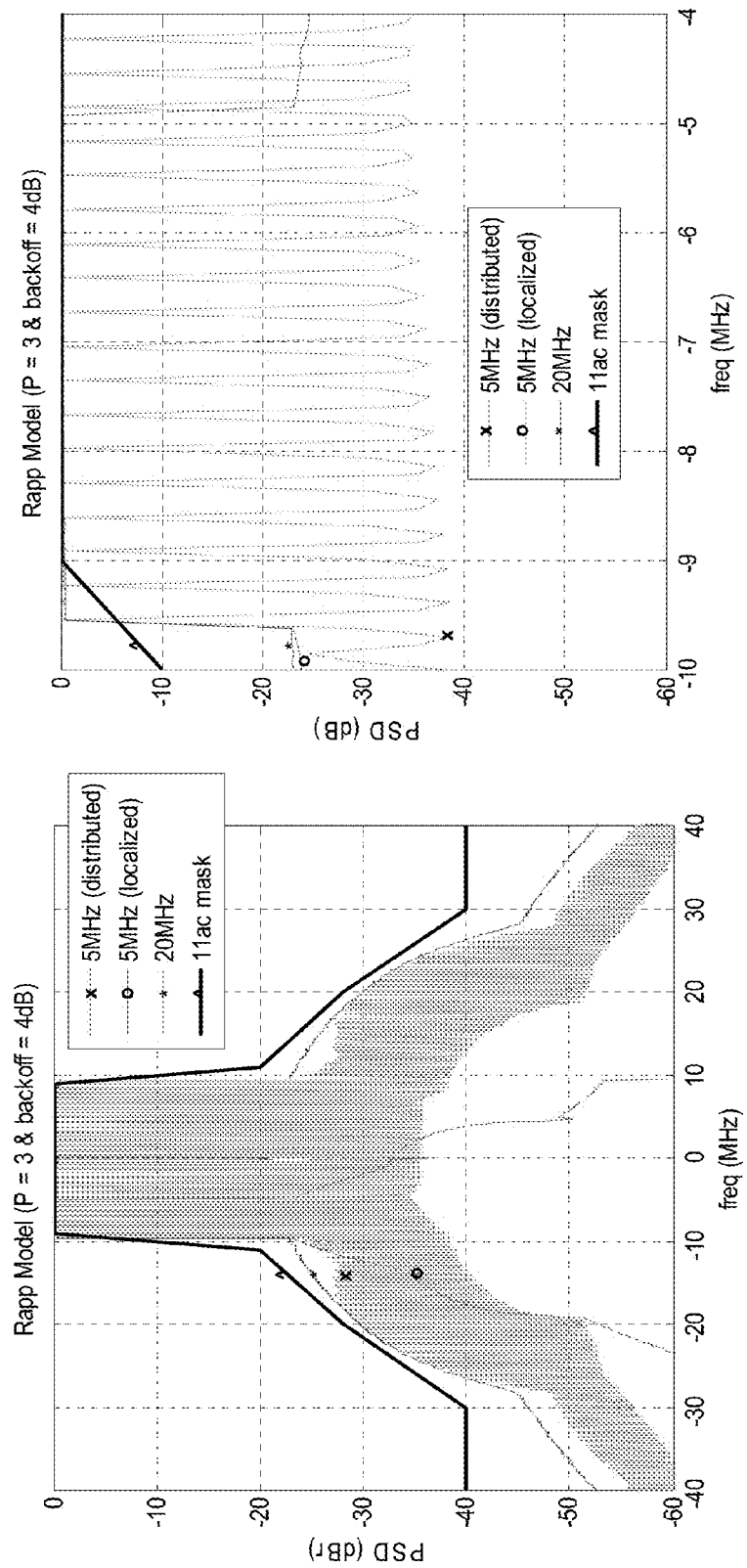
FIGS. 14A and 14B are illustrations of power spectral density plots for distributed and subband allocations, illustrating leakage across OFDMA users.

FIGS. 14A and 14B are illustrations of power spectral density plots for distributed and subband allocations, illustrating leakage across OFDMA users. Generally, distributed uplink OFDMA might lead to less leakage across STAs. Power leakage to adjacent tones is −23 dB for subband (localized) vs −30 dB for distributed. However, it may be noted that using a subband allocation may allow guard tones to be placed between different users. However, it may still require that 3 MHz of tones be placed around each user in order to reduce the leakage in a subband allocation to the levels of a distributed allocation.

Blocking performance may also be compared between subband and distributed allocations. Here, the adjacent channel interferer is OFDMA signal. In a distributed allocation, the impact of blocking may be similar to a non-OFDMA transmission of the same bandwidth. In a subband OFDMA allocation, the impact of blocking may depends on the subband location. For example, simulations may be needed to quantify the worst case blocking performance degradation.

In some aspects, subband-based OFDMA may offer some gain over distributed tone allocations. For example, STAs may be allocated to their best sub-channel, in which that device may most effectively transmit or receive. FIG. 15 is a chart illustration realistic gains which are possible when using subband OFDMA allocations rather than distributed allocations. These values are shown in dB, in D-NLOS channels. These may be generated by comparing the linear averaged channel gain at 10% fading. In some aspects, the collision of the best channels of various STAs is considered as well. Generally, the number of STAs here may correspond to the total bandwidth of a transmission divided by the minimum allocation size. So, for example, when there is a 20 MHz transmission and a 5 MHz minimum allocation size, the numbers illustrated may reflect a scenario in which there are four STAs.

Generally, distributed allocations may be less amenable to smoother than subband allocations. For example, the tones of a user may be spaced far apart in frequency. Accordingly, the loss of smoothing gain may be slightly over 1 dB. Signal to noise ratio (SNR) loss due to channel estimation error, β, may be approximated using the formula:

$$\beta = 1 + \frac{1}{p} + \frac{1}{p * SINR_{n,ideal}}$$

where p is the SNR ratio of channel estimation versus data tones. Generally, p may be equal to 1 when no smoothing is done and p may be equal to 2 for frequency domain smoothing.

In some aspects, choosing an allocation scheme may impact other aspect of PHY protocol designs. For example, possible areas of impact may include SIG field design. It may become less important to order users in a distributed option, for example. Thus, Group ID-based proposals, which may be less able to order users, may be used. It is unlikely tone plan selection would be affected, as they should not be so sensitive because the same overall number of tones will be divided between the users. Further, the distributed option may make it impossible to pre-allocate STAs to different 20 MHz bands, although such an option may still be available using a hybrid allocation. Further, a distributed allocation may make interference management using OFDMA difficult, although a hybrid option may help.

FIG. 16 illustrates a comparison between distributed and sub-band allocations on a number of different metrics. For example, a distributed allocation may be able to transmit at 6, 9, or 12 dB more power than a subband allocation, when using 1.25, 2.5, and 5 MHz tones, respectively. However, frequency selective scheduling gain may result in a 1 to 2 dB better signal with subband allocations. Similarly, channel smoothing may result in a 1 dB better signal with a subband allocation. A distributed allocation may also require extra back-off, with regards to spectral mask requirements and out of band emissions. A distributed allocation may have less leakage to adjacent OFDMA tones of other devices, with −30 dBr leakage, as compared to −23 dBr leakage for a subband allocation. Blocking of adjacent channels in a subband allocation may get worse if the subband interferer is at the channel edge. Finally, as noted above, regulatory risk may be less with a distributed allocation, since such an allocation may already meet ETSI guidelines.

FIG. 17 illustrates dBm per MHz considerations that may be taken into account for a transmission in the 5 GHz frequency range. In some aspects, this figure may reflect that the FCC terminology of Intentional Radiator is the transmitter power of the wireless equipment, such as a wireless access point, router or bridge. Further, it may be noted that if antenna gain is greater than 6 dBi, both the maximum conducted power and the maximum power spectral density are reduced. Further, for slave devices without a radar interference detection function, the point-to-point maximum international radiator power may be 23 dBm. For other devices, this may be 30 dBm, and the maximum power per user assuming 5 MHz of bandwidth may be 24 dBm.

FIG. 18 illustrates dBm per MHz considerations that may be taken into account for a transmission in the 2.4 GHz frequency range. Generally, these FCC considerations may take into account a limit of power spectral density with up to a 6 dBi antenna gain. If antenna is greater than 6 dBi, then the output power must be reduced by 1 dB per dBi of antenna gain.

FIG. 19 illustrates test cases which were used to generate the information found in FIGS. 17 and 18. Generally, PSD waveforms for the transmit signal with 4× symbol duration were generated for four cases: a single user transmitting a 20 MHz transmission, a single user with a 5 MHz localized allocation in a 20 MHz transmission, and a single user with a 5 MHz distributed allocation in a 20 MHz transmission. Generally, only the data portion of the transmitted signals is studied for these purposed, and the Rapp PA model with Knee parameter P=3 and PA backoff=4 dB was used.

Figure 20:
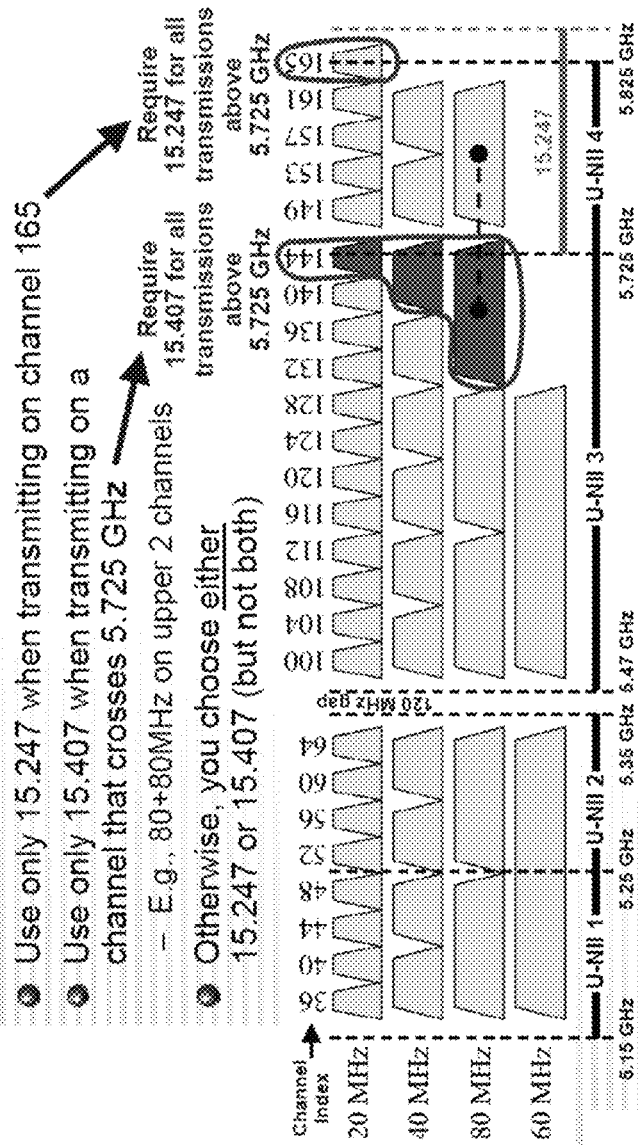
FIG. 20 illustrates which Federal Communication Commission (FCC) rules may apply for various portions of the 5 GHz spectrum.

It may also be useful to consider out of band emission (OOBE) requirements for a 5 GHz band, when choosing a tone allocation. FIG. 20 illustrates which Federal Communication Commission (FCC) rules may apply for various portions of the 5 GHz spectrum. FIG. 21 illustrates which OOBE FCC may apply for various types of transmissions which may occur.

For example, FCC rule 15.247(d) specifies that in any 100 kHz bandwidth outside of the authorized frequency band, the power shall be attenuated according to certain conditions. First, if the maximum peak conducted output power procedure was used to demonstrate compliance to 15.247 (b)(3) requirements, then the peak conducted output power measured in any 100 kHz bandwidth outside of the authorized frequency band shall be attenuated by at least 20 dB relative to the maximum in-band peak PSD level in 100 kHz. Second, if maximum conducted output power was used to demonstrate compliance to 15.247(b)(3) requirements, then the peak power in any 100 kHz bandwidth outside of the authorized frequency band shall be attenuated by at least 30 dB relative to the maximum in-band average PSD level in 100 kHz. However, in either case, attenuation to levels below the general emission limits specified in §15.209(a) is not required.

FCC rule 15.407(b) describes undesirable emission limits: Except as shown in paragraph (b)(6) of this section, the peak emissions outside of the frequency bands of operation shall be attenuated in accordance with the following limits:

For transmitters operating in the 5.15-5.25 GHz band: all emissions outside of the 5.15-5.35 GHz band shall not exceed an EIRP of −27 dBm/MHz.

For transmitters operating in the 5.25-5.35 GHz band: all emissions outside of the 5.15-5.35 GHz band shall not exceed an EIRP of −27 dBm/MHz. Devices operating in the 5.25-5.35 GHz band that generate emissions in the 5.15-5.25 GHz band must meet all applicable technical requirements for operation in the 5.15-5.25 GHz band (including indoor use) or alternatively meet an out-of-band emission EIRP limit of −27 dBm/MHz in the 5.15-5.25 GHz band.

For transmitters operating in the 5.47-5.725 GHz band: all emissions outside of the 5.47-5.725 GHz band shall not exceed an EIRP of −27 dBm/MHz.

For transmitters operating in the 5.725-5.825 GHz band: all emissions within the frequency range from the band edge to 10 MHz above or below the band edge shall not exceed an EIRP of −17 dBm/MHz; for frequencies 10 MHz or greater above or below the band edge, emissions shall not exceed an EIRP of −27 dBm/MHz.

Figure 23:
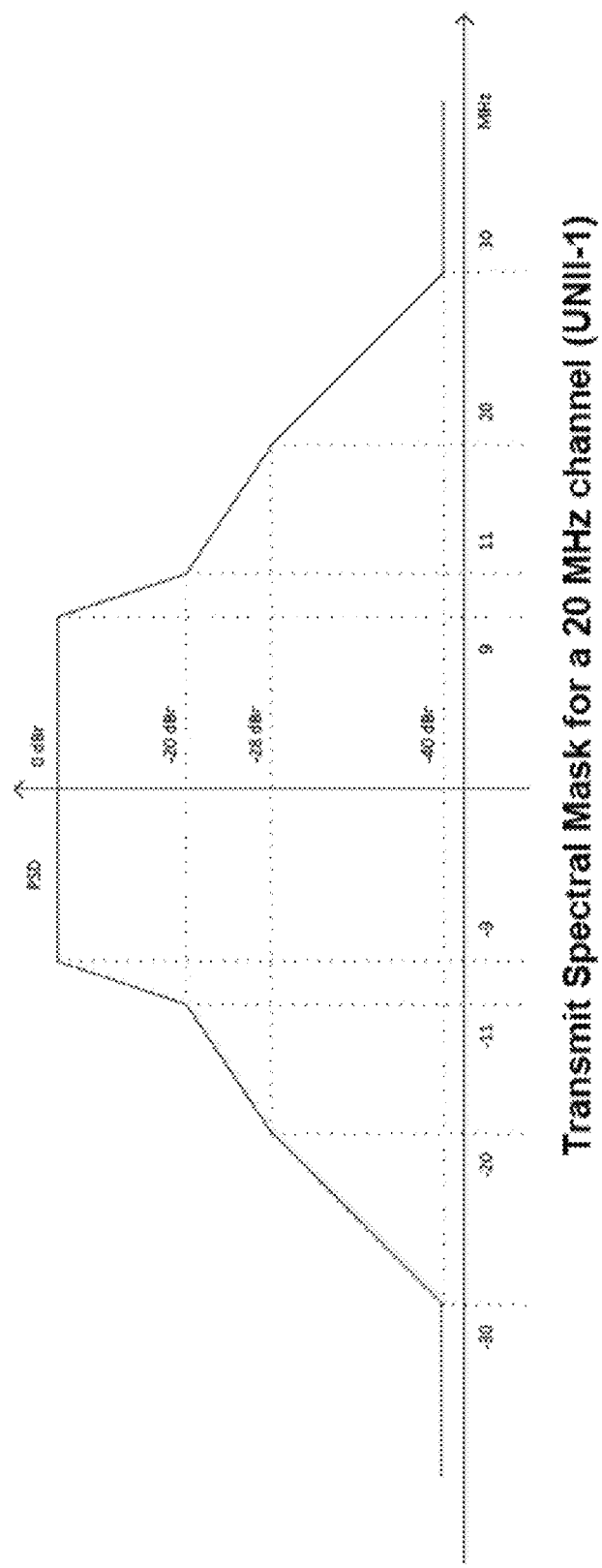
FIG. 23 illustrates a transmission spectral mask for a 20 MHz channel in an LTE-U transmission (UNII-1).
Figure 24:
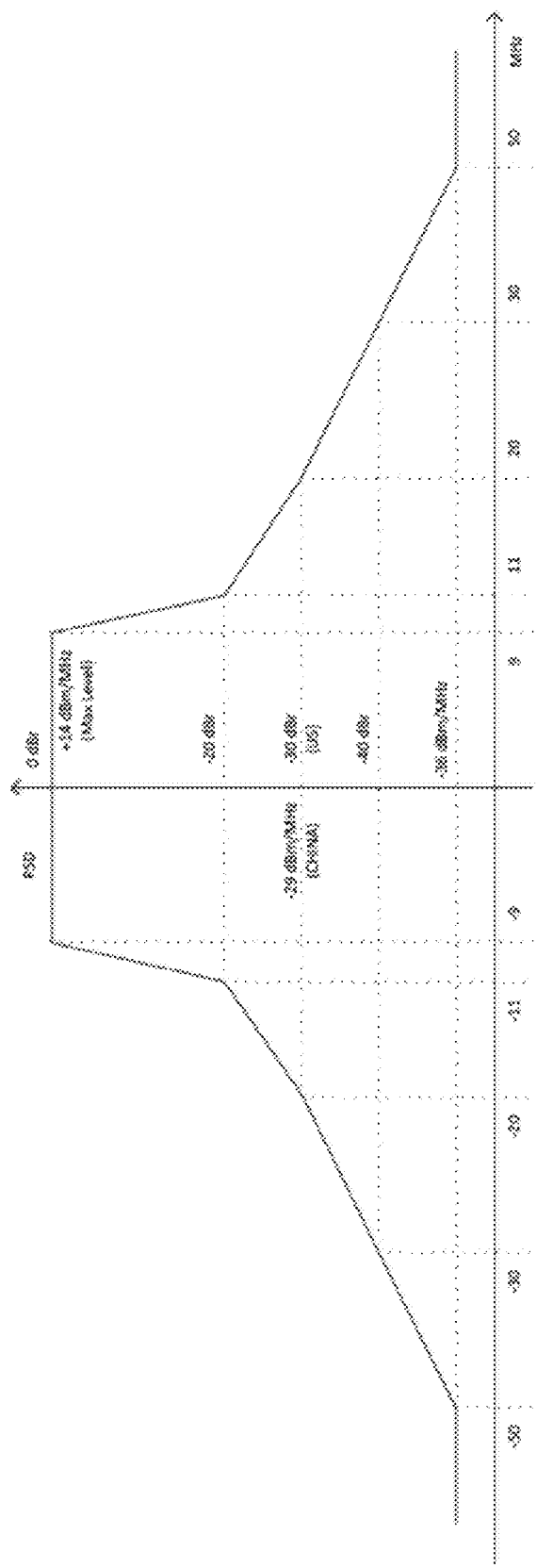
FIG. 24 illustrates a spectral mask for a 20 MHz channel (UNII-3).
Figure 25:
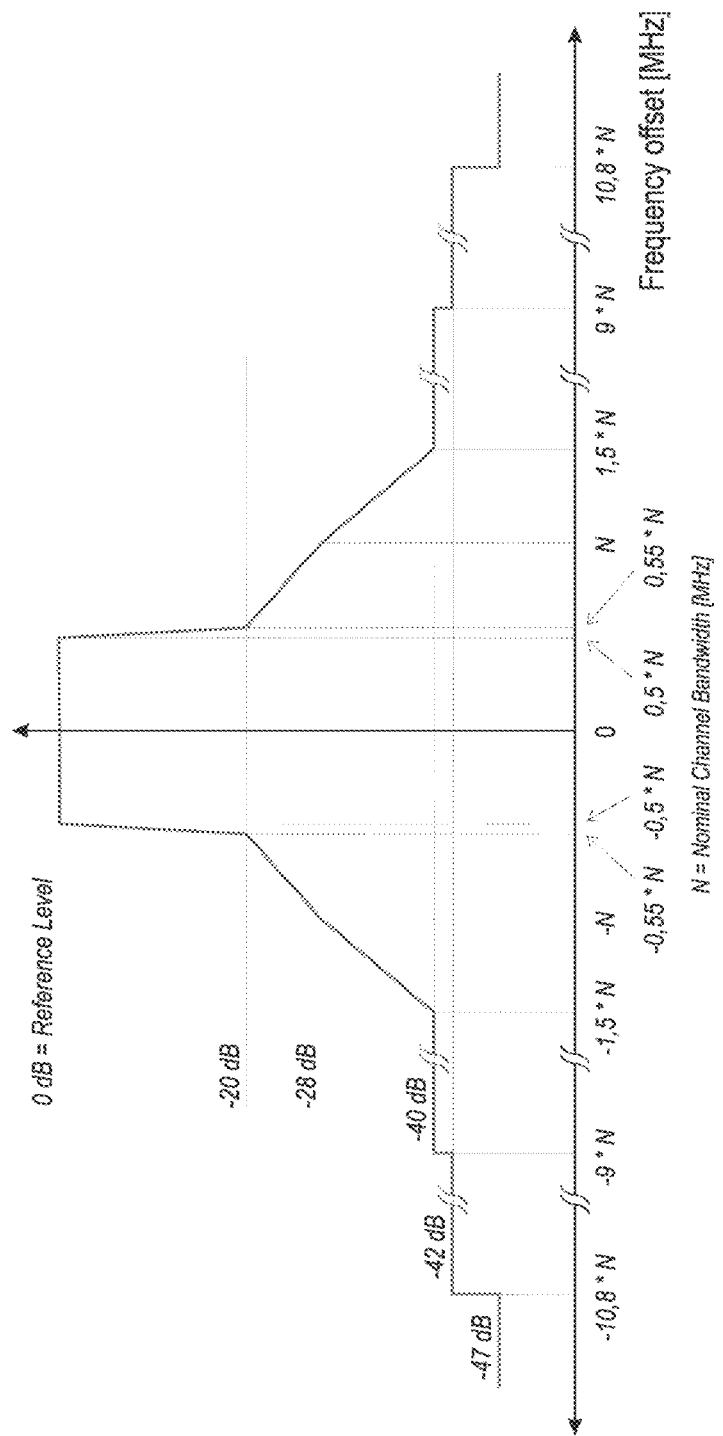
FIG. 25 illustrates an ETSI transmission spectral power mask.

FIGS. 22A, 22B, and 22C illustrate spectral mask requirements for a 5 HGz band transmission in IEEE 802.11ac, for each of 20, 40, and 80 MHz transmissions, respectively. FIG. 23 illustrates a transmission spectral mask for a 20 MHz channel in an LTE-U transmission (UNII-1). Generally, the maximum level (0 dBc) is calculate as "Pwr_antenna −10 log 10(18)," which converts antenna port power from integrated 18 MHz power to dBm/Hz. FIG. 24 illustrates a spectral mask for a 20 MHz channel (UNII-3). FIG. 25 illustrates an ETSI transmission spectral power mask. Here, the 5 GHz RLAN bands include a total frequency range that consists of two subbands: 5.150 MHz to 5350 MHz, and 5470 MHz to 5725 MHz. This mask was loosened to support VHT80. Here, the first roll-off starts at the bandwidth divided by two, rather than band edge (inband). FIGS. 26A-26D illustrates absolute out of band emissions for IEEE 802.11ac for each of 20, 40, 80, and 160 MHz.

Figure 27:
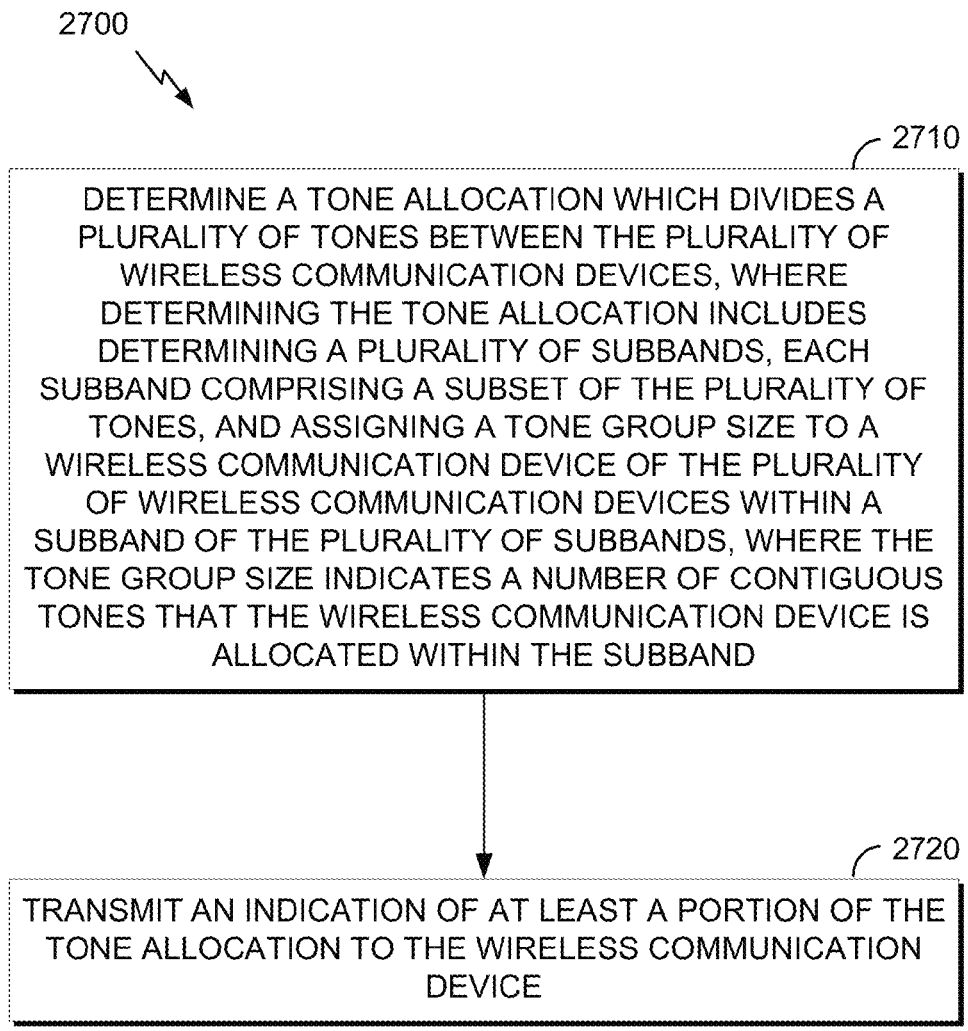
FIG. 27 is an exemplary method of transmitting tone allocations for wireless communications according to some aspects of the present disclosure.

FIG. 27 is an exemplary method 2700 of transmitting a tone allocation to a plurality of wireless communication devices. In some aspects, this method may be done by an AP 104 or another wireless device. This method may be used to signal allocations for an OFDMA transmission, including either an UL or a DL OFDMA transmission.

At block 2710, the AP 104 determines a tone allocation which divides a plurality of tones between the plurality of wireless communication devices. The AP 104 determines the tone allocation by determining one or more subbands, each subband comprising a subset of the plurality of tones, and assigning a tone group size to a wireless communication device of the plurality of wireless communication devices within a subband of the one or more subbands. The tone group size indicates a number of contiguous tones that the wireless communication device is allocated within the subband.

For example, each subband may be assigned to one or more wireless communication devices, and each wireless communication device may be assigned to one subband. Each of those devices may be configured to either transmit or receive using that subband. Where two or more devices are assigned to the same subband, those devices may be configured to transmit using only a subset of the tones in that subband. For example, each of those devices may be configured to transmit using tones as illustrated in FIGS. 5 and 7. In some aspects, the AP 104 may determine which subband to assign various devices to based, at least in part, on the capabilities and performance of that device in a particular subband. For example, a given device may be able to more effectively transmit and/or receive in a given subband, and may therefore be assigned to this subband. For example, the AP 104 may be configured to determine or receive subband-specific gain information, in order to help determine which devices may operate most effectively in each subband.

In some aspects, different devices may be assigned different tone group sizes. For example, the tone group size assigned to a particular device may be determined based, at least in part, on an amount of data that is queued for that device in either uplink or downlink. For example, a device which wishes to transmit or receive a relatively large amount of data may be assigned a larger tone group size. In some aspects, the tone groups of various devices may be organized in the manner illustrated in FIG. 6. In some aspects, both subbands and tone groups may be used together, as illustrated in FIG. 7.

At block 2720, the AP 104 transmits an indication of at least a portion of the tone allocation to each of the plurality of wireless communication devices. For example, the tone allocation, or an indication of at least a portion thereof, can be included in a trigger message for an uplink OFDMA message, which may inform devices which devices may have the chance to transmit in the UL OFDMA message, and also inform devices which tones they may transmit on. In some aspects, this transmission may be transmitted as part of a DL OFDMA message, such as in the header of that message. For example, a DL OFDMA message may contain a header which may identify devices which have data in the transmission, and inform those devices which tones their data may be transmitted on. In some aspects, the device may further transmit the DL OFDMA message to the various devices. In some aspects, the device may further receive an UL OFDMA message which is transmitted using the tone allocation.

In various embodiments, each tone of the plurality of tones can be allocated to only one wireless communication device of the plurality of wireless communication devices, and the tone allocation can be used for one of an uplink or a downlink orthogonal frequency division multiple access message. In various embodiments, transmitting the indication of at least a portion of the tone allocation to the wireless communication device can include transmitting the indication in a header of a message. In various embodiments, transmitting the indication of at least a portion of the tone allocation to the wireless communication device can include transmitting the indication in a trigger message.

In various embodiments, the method can further include transmitting a downlink message to each of the plurality of wireless communication devices using the tone allocation. In various embodiments, the method can further include receiving an uplink message, transmitted by the wireless communication device using the tone allocation. In various embodiments, the subband can be assigned to two or more devices of the plurality of wireless communication devices.

In various embodiments, the tone group size can be one, the one or more subbands can include a single subband, and the tone allocation can assign tones to the wireless communication device within the single subband according to the tone group size. In various embodiments, the tone group size can be one, the one or more subbands can include a plurality of subbands, and the tone allocation can assign tones to the wireless communication device within each of the plurality of subbands according to the tone group size. In various embodiments, the tone group size can be greater than one, the one or more subbands can include a single subband, and the tone allocation can assign tones to the wireless communication device within the single subband according to the tone group size. In various embodiments, the tone group size can be greater than one, the one or more subbands can include a plurality of subbands, and the tone allocation can assign tones to the wireless communication device within each of the plurality of subbands according to the tone group size.

In various embodiments, the wireless communication device can be allocated every Nth tone within the subband, where N can be a number of wireless communication devices, of the plurality of wireless communication devices, that are assigned tones within the subband. In various embodiments, the wireless communication device can be allocated multiple contiguous tones according to the tone group size in every Nth tone group within the subband, where N can be a number of wireless communication devices, of the plurality of wireless communication devices, that are assigned tones within the subband. In various embodiments, each wireless communication device of the plurality of wireless communication devices can be assigned a tone group size and a subband of the plurality of subbands, and can be allocated every Nth tone group within the subband, where N can be a number of wireless communication devices, of the plurality of wireless communication devices, that are assigned tones within the subband.

In an embodiment, the method shown in FIG. 27 can be implemented in a wireless device that can include a determining circuit, an assigning circuit, and a transmitting circuit. Those skilled in the art will appreciate that a wireless device can have more components than the simplified wireless device described herein. The wireless device described herein includes only those components useful for describing some prominent features of implementations within the scope of the claims.

The determining circuit can be configured to determining the tone allocation and/or determine one or more subbands. In some embodiments, the generating circuit can be configured to perform at least a portion of block 2710 of FIG. 27. The determining circuit can include one or more of the processor 204 (FIG. 2), the memory 206 (FIG. 2), and the DSP 220 (FIG. 2). In some implementations, means for determining can include the determining circuit.

The assigning circuit can be configured to assigning the tone allocation and/or assigned one or more subbands. In some embodiments, the generating circuit can be configured to perform at least a portion of block 2710 of FIG. 27. The assigning circuit can include one or more of the processor 204 (FIG. 2), the memory 206 (FIG. 2), and the DSP 220 (FIG. 2). In some implementations, means for assigning can include the assigning circuit.

The transmitting circuit can be configured to transmit the tone allocation, an indication of at least a portion of the tone allocation, and/or packets according to the tone allocation. In some embodiments, the transmitting circuit can be configured to perform at least block 2720 of FIG. 27. The transmitting circuit can include one or more of the transmitter 210 (FIG. 2), the antenna 216 (FIG. 2), and the transceiver 214 (FIG. 2). In some implementations, means for transmitting can include the transmitting circuit.

In various embodiments, the wireless device can further include a receiving circuit. The receiving circuit can be configured to receive packets according to the tone allocation. The receiving circuit can include one or more of the receiver 212 (FIG. 2), the antenna 216 (FIG. 2), and the transceiver 214 (FIG. 2). In some implementations, means for receiving can include the receiving circuit.

A person/one having ordinary skill in the art would understand that information and signals can be represented using any of a variety of different technologies and techniques. For example, data, instructions, commands, information, signals, bits, symbols, and chips that can be referenced throughout the above description can be represented by voltages, currents, electromagnetic waves, magnetic fields or particles, optical fields or particles, or any combination thereof.

Various modifications to the implementations described in this disclosure can be readily apparent to those skilled in the art, and the generic principles defined herein can be applied to other implementations without departing from the spirit or scope of this disclosure. Thus, the disclosure is not intended to be limited to the implementations shown herein, but is to be accorded the widest scope consistent with the claims, the principles and the novel features disclosed herein. The word "exemplary" is used exclusively herein to mean "serving as an example, instance, or illustration." Any implementation described herein as "exemplary" is not necessarily to be construed as preferred or advantageous over other implementations.

Certain features that are described in this specification in the context of separate implementations also can be implemented in combination in a single implementation. Conversely, various features that are described in the context of a single implementation also can be implemented in multiple implementations separately or in any suitable sub-combination. Moreover, although features can be described above as acting in certain combinations and even initially claimed as such, one or more features from a claimed combination can in some cases be excised from the combination, and the claimed combination can be directed to a sub-combination or variation of a sub-combination.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various operations of methods described above can be performed by any suitable means capable of performing the operations, such as various hardware and/or software component(s), circuits, and/or module(s). Generally, any operations illustrated in the Figures can be performed by corresponding functional means capable of performing the operations.

The various illustrative logical blocks, modules and circuits described in connection with the present disclosure can be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor can be a microprocessor, but in the alternative, the processor can be any commercially available processor, controller, microcontroller or state machine. A processor can also be implemented as a combination of computing devices, e.g., a combination of a DSP and a microprocessor, a plurality of microprocessors, one or more microprocessors in conjunction with a DSP core, or any other such configuration.

In one or more aspects, the functions described can be implemented in hardware, software, firmware, or any combination thereof. If implemented in software, the functions can be stored on or transmitted over as one or more instructions or code on a computer-readable medium. Computer-readable media includes both computer storage media and communication media including any medium that facilitates transfer of a computer program from one place to another. A storage media can be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Thus, in some aspects computer readable medium can comprise non-transitory computer readable medium (e.g., tangible media). In addition, in some aspects computer readable medium can comprise transitory computer readable medium (e.g., a signal). Combinations of the above should also be included within the scope of computer-readable media.

The methods disclosed herein comprise one or more steps or actions for achieving the described method. The method steps and/or actions can be interchanged with one another without departing from the scope of the claims. In other words, unless a specific order of steps or actions is specified, the order and/or use of specific steps and/or actions can be modified without departing from the scope of the claims.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

While the foregoing is directed to aspects of the present disclosure, other and further aspects of the disclosure can be devised without departing from the basic scope thereof, and the scope thereof is determined by the claims that follow.

What is claimed is:

1. A method of allocating tones between a plurality of wireless communication devices, comprising:
   determining a tone allocation which divides a plurality of tones between the plurality of wireless communication devices, wherein determining the tone allocation comprises:
      determining one or more subbands, each subband comprising a subset of the plurality of tones; and
      assigning within a subband, of the one or more subbands, every Nth instance of a tone group size to a wireless communication device of the plurality of wireless communication devices, each tone group having a size indicating a number of contiguous tones that the wireless communication device is allocated for each instance of the tone group, where N is a number of wireless communication devices, of the plurality of wireless communication devices, that are assigned tones within the subband; and
   transmitting an indication of at least a portion of the tone allocation to the wireless communication device.

2. The method of claim 1, wherein transmitting the indication of at least a portion of the tone allocation to the wireless communication device comprises transmitting the indication in a header of a message.

3. The method of claim 1, wherein transmitting the indication of at least a portion of the tone allocation to the wireless communication device comprises transmitting the indication in a trigger message.

4. The method of claim 1, further comprising transmitting a downlink message to each of the plurality of wireless communication devices using the tone allocation.

5. The method of claim 1, further comprising receiving an uplink message, transmitted by the wireless communication device using the tone allocation.

6. The method of claim 1, wherein the subband is assigned to two or more devices of the plurality of wireless communication devices.

7. The method of claim 1, wherein the size is one.

8. The method of claim 1, wherein the size is greater than one.

9. An apparatus configured to allocate tones between a plurality of Wireless communication devices, comprising:

a memory that stores instructions;
a processor coupled with the memory and configured to execute the instructions to:
  determine a tone allocation which divides a plurality of tones between the plurality of wireless communication devices, where the processor is configured to determine the tone allocation by being configured to:
  determine one or more subbands, each subband comprising a subset of the plurality of tones; and
  assign within a subband, of the one or more subbands, every Nth instance of a tone group size to a wireless communication device of the plurality of wireless communication devices, each tone group having a size indicating a number of contiguous tones that the wireless communication device is allocated for each instance of the tone group, where N is a number of wireless communication devices, of the plurality of wireless communication devices, that are assigned tones within the subband; and
  a transmitter configured to transmit an indication of at least a portion of the tone allocation to the wireless communication device.

10. The apparatus of claim 9, wherein the transmitter is configured to transmit the indication of at least a portion of the tone allocation to the wireless communication device by transmitting the indication in a header of a message.

11. The apparatus of claim 9, wherein the transmitter is configured to transmit the indication of at least a portion of the tone allocation to the wireless communication device by transmitting the indication in a trigger message.

12. The apparatus of claim 9, wherein the transmitter is further configured to transmit a downlink message to each of the plurality of wireless communication devices using the tone allocation.

13. The apparatus of claim 9, further comprising a receiver configured to receive an uplink message, transmitted by the wireless communication device using the tone allocation.

14. The apparatus of claim 9, wherein the subband is assigned to two or more devices of the plurality of wireless communication devices.

15. The apparatus of claim 9, wherein the size is one.

16. The apparatus of claim 9, wherein the size is greater than one.

17. An apparatus for allocating tones between a plurality of wireless communication devices, comprising:
  means for determining a tone allocation which divides a plurality of tones between the plurality of wireless communication devices, wherein means for determining the tone allocation comprises:
    means for determining one or more subbands, each subband comprising a subset of the plurality of tones; and
    means for assigning within a subband, of the one or more subbands, every Nth instance of a tone group size to a wireless communication device of the plurality of wireless communication devices, each tone group having a size indicating a number of contiguous tones that the wireless communication device is allocated for each instance of the tone group, where N is a number of wireless communication devices, of the plurality of wireless communication devices, that are assigned tones within the subband; and
  means for transmitting an indication of at least a portion of the tone allocation to the wireless communication device.

18. The apparatus of claim 17, wherein the size is one.

19. The apparatus of claim 17, wherein the size is greater than one.

20. A non-transitory computer readable storage medium comprising computer executable instructions configured to implement a method for wireless communication, the method comprising:
  determining a tone allocation which divides a plurality of tones between a plurality of wireless communication devices, wherein determining the tone allocation comprises:
    determining one or more subbands, each subband comprising a subset of the plurality of tones; and
    assigning within a subband, of the one or more subbands, every Nth instance of a tone group size to a wireless communication device of the plurality of wireless communication devices, each tone group having a size indicating indicates a number of contiguous tones that the wireless communication device is allocated for each instance of the tone group, where N is a number of wireless communication devices, of the plurality of wireless communication devices, that are assigned tones within the subband; and
  transmitting an indication of at least a portion of the tone allocation to the wireless communication device.

* * * * *

UNITED STATES PATENT AND TRADEMARK OFFICE
CERTIFICATE OF CORRECTION

PATENT NO. : 9,807,767 B2
APPLICATION NO. : 14/848068
DATED : October 31, 2017
INVENTOR(S) : Jialing Li Chen et al.

Page 1 of 1

It is certified that error appears in the above-identified patent and that said Letters Patent is hereby corrected as shown below:

In the Specification

In Column 7 at Line 32, Change "HGz" to --GHz--.

In Column 13 at Lines 7-8 (approx.), Change "the a" to --a--.

In Column 14 at Line 2, Change "to to" to --to--.

In Column 14 at Line 60, Change "Transmittor" to --Transmitter--.

In Column 19 at Line 59, Change "HGz" to --GHz--.

In Column 20 at Line 2, Change "5.150" to --5150--.

In the Claims

In Column 24 at Line 35, In Claim 1, after "group" delete "size".

In Column 24 at Line 67, In Claim 9, change "Wireless" to --wireless--.

In Column 25 at Line 11, In Claim 9, after "group" delete "size".

In Column 26 at Line 8 (approx.), In Claim 17, before "to" delete "size".

In Column 26 at Line 36 (approx.), In Claim 20, after "group" delete "size".

In Column 26 at Line 39 (approx.), In Claim 20, after "indicating" delete "indicates".

Signed and Sealed this
Thirty-first Day of July, 2018

Andrei Iancu
*Director of the United States Patent and Trademark Office*